US008218775B2

(12) United States Patent
Norvell et al.

(10) Patent No.: US 8,218,775 B2
(45) Date of Patent: Jul. 10, 2012

(54) JOINT ENHANCEMENT OF MULTI-CHANNEL AUDIO

(75) Inventors: Erik Norvell, Stockholm (SE); Anisse Taleb, Kista (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 214 days.

(21) Appl. No.: 12/677,383

(22) PCT Filed: Apr. 17, 2008

(86) PCT No.: PCT/SE2008/000272

§ 371 (c)(1), (2), (4) Date: Mar. 10, 2010

(87) PCT Pub. No.: WO2009/038512

PCT Pub. Date: Mar. 26, 2009

(65) Prior Publication Data

US 2010/0322429 A1 Dec. 23, 2010

Related U.S. Application Data

(60) Provisional application No. 60/960,175, filed on Sep. 19, 2007.

(51) Int. Cl.
*H04R 5/00* (2006.01)
*G10L 19/00* (2006.01)
*G06F 17/00* (2006.01)

(52) U.S. Cl. ............. 381/23; 704/500; 704/501; 700/94

(58) Field of Classification Search .................... 381/23, 381/17, 22; 700/94; 704/500, 501
See application file for complete search history.

(56) References Cited

U.S. PATENT DOCUMENTS

| | | | |
|---|---|---|---|
| 5,285,498 A | 2/1994 | Johnston | |
| 5,434,948 A | 7/1995 | Holt et al. | |
| 6,125,348 A * | 9/2000 | Levine | 704/500 |
| 6,629,078 B1 | 9/2003 | Grill et al. | |
| 7,231,054 B1 * | 6/2007 | Jot et al. | 381/310 |
| 2006/0190247 A1 | 8/2006 | Lindblom | |

FOREIGN PATENT DOCUMENTS

EP 0497413 A1 1/1992
(Continued)

OTHER PUBLICATIONS

PCT International Search Report, dated Nov. 28, 2008, in connection with International Application No. PCT/SE20081000272.

(Continued)

*Primary Examiner* — Vivian Chin
*Assistant Examiner* — Douglas Suthers
(74) *Attorney, Agent, or Firm* — Potomac Patent Group PLLC

(57) ABSTRACT

An overall encoding procedure and associated decoding procedure are presented. The encoding procedure involves at least two signal encoding processes operating on signal representations of a set of audio input channels. Local synthesis is used in connection with a first encoding process to generate a locally decoded signal, including a representation of the encoding error of the first encoding process. This locally decoded signal is applied as input to a second encoding process. The overall encoding procedure generates at least two residual encoding error signals from at least one of said encoding processes, including at least said second encoding process. The residual error signals are then subjected to compound residual encoding in a further encoding process, preferably based on correlation between the residual error signals.

30 Claims, 16 Drawing Sheets

FOREIGN PATENT DOCUMENTS

| | | | |
|---|---|---|---|
| EP | 1 818 911 | A1 | 8/2007 |
| WO | 0223528 | A1 | 3/2002 |
| WO | 0223529 | A1 | 3/2002 |
| WO | 2004072956 | A1 | 8/2004 |
| WO | 2006089570 | A1 | 8/2006 |
| WO | 2006091150 | A1 | 8/2006 |
| WO | 20061091139 | A1 | 8/2006 |

OTHER PUBLICATIONS

PCT Written Opinion, dated Nov. 28, 2008, in connection with International Application No. PCT/EP20081000272.

International Organization for Standardization ISO/IEC JTC 1, SC 29, WG 11/M11657, "Performance and functionality of existing MPEG-4 technology in the context of Cfl on Scalable Speech and Audio Coding", Jan. 2005, Hong Kong, CN.

Hui Dong et al. "SNR and bandwidth scalable speech coding", 2002 IEEE International Symposium on Circuits and Systems, Vol. 2, pp. II-859-II-862.

McCREE et al. "An embedded adaptive multi-rate wideband speech coder", 2001 IEEE International Conference on Acoustics, Speech and Signal Processing, Salt Lake City, Utah, USA, May 7-11, 2001. ISBN: 0-7803-7041-4.

Koishida et al. "A 16-KBIT/S Bandwidth Scalable Audio Coder based on the G.729 Standard", Proceedings of the 2000 IEEE International Conference on Acoustics, Speech and Signal Processing, pp. II-149-II-152. ISBN: 0-7803-6293-4.

Sjoberg et al. "Real-Time Transport Protocol (RTP) Payload Format and File Storage Format for the Adaptive Multi-Rate (AMR) and Adaptive Multi-Rate Wideband (AMR-WB) Audio Codes", RFC 3267, IEFT, Jun. 2002. The Internet Society, 2002.

Hui Dong et al. "Multiple description speech coder based on AMR-WB for Mobile ad-hoc networks" 2004 IEEE International Conference on Acoustics, Speech and Signal Processing, May 21, 2004, vol. 1, pp. I-277-280.

Chibani, M. et al. "Increasing the Robustness of CELP-Based Coders by Constrained Optimization", 2005 IEEE International Conference on Acoustics, Speech and Signal Processing, Mar. 18-23, 2005, vol. 1, pp. 785-788. ISBN: 0-7803-8874-7.

Herre, J. et al. "Overview of MPEG-4 Audio and its applications in Mobile Communications" Proceedings of the 5th Annual Conference on Signal Processing, 2000, Beijing, CN, vol. 1, pp. 11-20. ISBN: 0-7803-5747-7.

Kovesi, B. et al. "A Scalable Speech and Audio Coding Scheme with Continuous Bitrate Flexibility", 2004 IEEE International Conference on Acoustics, Speech and Signal Processing, May 17-21, 2004, pp. I-273-I-276. ISBN: 0-7803-8484-9.

Johansson, I. et al. "Bandwidth Efficient AMR Operation for VoIP" Proceedings of the IEEE Workshop on Speech Coding, Oct. 6-9, 2002, pp. 150-152. ISBN: 0-7803-7549-1.

Recchione, M. "The Enhanced Variable Rate Code: Toll Quality Speech for CDMA", International Journal of Speech Technology, vol. 2, No. 4, May 1999. Springer Netherlands, pp. 305-315. ISSN 1381-2416.

Uvliden et al. "Adaptive Multi-Rate—A speech service adapted to Cellular Radio Network Quality" 32nd Asilomar Conference on Signals, Systems and Computers, Nov. 1-4, 1998, vol. 2 pp. v-xxiii. ISBN: 0-7803-5148-7.

Chen et al. "Experiments on QoS Adaptation for Improving End User Speech Perception Over Multi-hop Wireless Networks", IEEE International Conference on Communications, Jun. 6-10, 1999, vol. 2, pp. 708-715. ISBN: 0-7803-5284-X.

Baumgarte, F. et al. "Binaural cue coding—Part I : Psychoacoustic fundamentals and design principles", IEEE Transactions on Speech and Audio Processing, vol. 11, No. 6, pp. 509-519, Nov. 2003.

PCT International Preliminary Report on Patentability, dated Nov. 28, 2008, in connection with International Application No. PCT/SE2008/000272.

Extended European Search Report, completed Aug. 26, 2011, in connection with European Application No. EP 08 75 3930.

Van Der Waal et al. "Subband coding of stereophonic digital audio signals", 1991 International Conference on Speech and Signal Processing, ICASSP, New York, IEEE, US, vol. Conf. 16, Apr. 14, 1991, pp. 3601-3604, XP010043648, DOI: 10.1109/ICASSP.1991.151053, ISBN: 978-0-7803-0003-3.

Chinese Office Action, dated Dec. 7, 2011, in connection with Chinese Patent Application No. 200880108354.0 (See Foreign Associate provided translation below).

Foreign Associate provided translation of Chinese Office Action, dated Dec. 7, 2011, in connection with Chinese Patent Application No. 200880108354.0.

* cited by examiner

FROM FIG. 11A →

JOINT ENHANCEMENT OF MULTI-CHANNEL AUDIO

CROSS-REFERENCE TO RELATED APPLICATIONS

This application claims the benefit of U.S. Provisional Application No. 60/960,175, filed Sep. 19, 2007, which is hereby incorporated herein by reference in its entirety.

TECHNICAL FIELD

The present invention generally relates to audio encoding and decoding techniques, and more particularly to multi-channel audio encoding such as stereo coding.

BACKGROUND

The need for offering telecommunication services over packet switched networks has been dramatically increasing and is today stronger than ever. In parallel there is a growing diversity in the media content to be transmitted, including different bandwidths, mono and stereo sound and both speech and music signals. A lot of efforts at diverse standardization bodies are being mobilized to define flexible and efficient solutions for the delivery of mixed content to the users. Noticeably, two major challenges still await solutions. First, the diversity of deployed networking technologies and user-devices imply that the same service offered for different users may have different user-perceived quality due to the different properties of the transport networks. Hence, improving quality mechanisms is necessary to adapt services to the actual transport characteristics. Second, the communication service must accommodate a wide range of media content. Currently, speech and music transmission still belong to different paradigms and there is a gap to be filled for a service that can provide good quality for all types of audio signals.

Today, scalable audiovisual and in general media content codecs are available, in fact one of the early design guidelines of MPEG was scalability from the beginning. However, although these codecs are attractive due to their functionality, they lack the efficiency to operate at low bitrates, which do not really map to the current mass market wireless devices. With the high penetration of wireless communications more sophisticated scalable-codecs are needed. This fact has been already realized and new codecs are to be expected to appear in the near future.

Despite the tremendous efforts being put on adaptive services and scalable codecs, scalable services will not happen unless more attention is given to the transport issues. Therefore, besides efficient codecs an appropriate network architecture and transport framework must be considered as an enabling technology to fully utilize scalability in service delivery. Basically, three scenarios can be considered:

- Adaptation at the end-points. That is, if a lower transmission rate must be chosen the sending side is informed and it performs scaling or codec changes.
- Adaptation at intermediate gateways. If a part of the network becomes congested, or has a different service capability, a dedicated network entity as illustrated in FIG. 1, performs the transcoding of the service. With scalable codec this could be as simple as dropping or truncating media frames.
- Adaptation inside the network. If a router or wireless interface becomes congested adaptation is performed right at the place of the problem by dropping or truncating packets. This is a desirable solution for transient problems like handling of severe traffic bursts or the channel quality variations of wireless links.

Scalable Audio Coding

Non-Conversational, Streaming/Download

In general the current audio research trend is to improve the compression efficiency at low rates (provide good enough stereo quality at bit rates below 32 kbps). Recent low rate audio improvements are the finalization of the Parametric Stereo (PS) tool development in MPEG, the standardization of a mixed CELP/and transform codec Extended AMR-WB (a.k.a. AMR-WB+) in 3GPP. There is also an ongoing MPEG standardization activity around Spatial Audio Coding (Surround/5.1 content), where a first reference model (RM0) has been selected.

With respect to scalable audio coding, recent standardization efforts in MPEG have resulted in a scalable to lossless extension tool, MPEG4-SLS. MPEG4-SLS provides progressive enhancements to the core AAC/BSAC all the way up to lossless with granularity step down to 0.4 kbps. An Audio Object Type (AOT) for SLS is yet to be defined. Further within MPEG a Call for Information (CfI) has been issued in January 2005 [1] targeting the area of scalable speech and audio coding, in the CfI the key issues addressed are scalability, consistent performance across content types (e.g. speech and music) and encoding quality at low bit rates (<24 kbps).

Speech Coding (Conversational Mono)

General

In general speech compression the latest standardization efforts is an extension of the 3GPP2NMR-WB codec to also support operation at a maximum rate of 8.55 kbps. In ITU-T the Multirate G.722.1 audio/video conferencing codec has previously been updated with two new modes providing super wideband (14 kHz audio bandwidth, 32 kHz sampling) capability operating at 24, 32 and 48 kbps. An additional mode is currently under standardization that will extend the bandwidth to 48 kHz full-band coding.

With respect to scalable conversational speech coding the main standardization effort is taking place in ITU-T, (Working Party 3, Study Group 16). There the requirements for a scalable extension of G.729 have been defined recently (November 2004), and the qualification process was ended in July 2005. This new G.729 extension will be scalable from 8 to 32 kbps with at least 2 kbps granularity steps from 12 kbps. The main target application for the G.729 scalable extension is conversational speech over shared and bandwidth limited xDSL-links, i.e. the scaling is likely to take place in a Digital Residential Gateway that passes the VoIP packets through specific controlled Voice channels (Vc's). ITU-T is also in the process of defining the requirements for a completely new scalable conversational codec in SG16/WP3/Question 9. The requirements for the Q.9/Embedded Variable rate (EV) codec were finalized in July 2006; currently the Q.9/EV requirements state a core rate of 8.0 kbps and a maximum rate of 32 kbps. A specific requirement for Q.9/EV fine grain scalability is not yet introduced instead certain operation points are likely to be evaluated, butt fine grain scalability is still an objective. The Q.9/EV core is not restricted to narrowband (8 kHz sampling) like the G.729 extension will be, i.e. Q.9/EV may provide wideband (16 kHz sampling) from the core layer and onwards. Further the requirements for an extension of the forthcoming Q.9/EV codec that will give it super wideband and stereo capabilities (32 kHz sampling/2 channels) was defined in November 2006.

SNR Scalability

There are a number of scalable conversational codec that can increase SNR with increasing amounts of bits/layers. E.g. MPEG4-CELP [8], G.727 (Embedded ADPCM) are SNR-scalable, each additional layer increases the fidelity of the reconstructed signal. Recently Kövesi et al has proposed a flexible SNR and bandwidth scalable codec [9], that achieves fine grain scalability from a certain core rate, enabling a fine granular optimization of the transport bandwidth, applicable for speech/audio conferencing servers or open loop network congestion control.

Bandwidth Scalability

There are also codecs that can increase bandwidth with increasing amount of bits. Examples include G722 (Sub band ADPCM), the TI candidate to the 3GPP WB speech codec competition [3] and the academic AMR-BWS [2] codec. For these codecs addition of a specific bandwidth layer increases the audio bandwidth of the synthesized signal from ~4 kHz to ~7 kHz. Another example of a bandwidth scalable coder is the 16 kbps bandwidth scalable audio coder based on G.729 described by Koishida in [4]. Also In addition to being SNR-scalable MPEG4-CELP specifies a SNR scalable coding system for 8 and 16 kHz sampled input signals [9].

Channel Robustness Technology

With regards to improving channel robustness of conversational codecs, this has been done in various ways for existing standards and codecs. For example:

EVRC (1995), Transmits a delta Delay parameter, which is a partial redundant coded parameter, making it possible to reconstruct the Adaptive Codebook State after a channel erasure, and thus enhancing error recovery. A detailed overview of EVRC is found in [11].

In AMR-NB [12], a speech service specified for GSM networks operates on a maximum source rate adaptation principle. The trade off between channel coding and source coding for a given gross bit rate is continuously monitored and adjusted by the GSM-system and the encoder source rate is adapted to provide the best quality possible. The source rate may be varied from 4.75 kbps to 12.2 kbps. And the channel gross rate is either 22.8 kbps or 11.4 kbps.

In addition to the maximum source rate adaptation capabilities described in the bullet above. The AMR RTP payload format [5] allows for the retransmission of whole past frames, significantly increasing the robustness to random frame errors. In [10] a multimode adaptive AMR system using the full and partial redundancy concepts adaptively is described. Further the RTP payload allows for interleaving of packets, thus enhancing the robustness for non-conversational applications.

Multiple Descriptive Coding in combination with AMR-WB is described in [6], further an adaptive codec mode selection scheme is proposed where AMR-WB is used for low error conditions and the described channel robust MD-AMR (WB) coder is used during severe error conditions.

A channel robustness technology variation to the transmitting redundant data technique is to adjust the encoder analysis to reduce the dependency of states; this is done in the AMR 4.75 encoding mode. The application of a similar encoder side analysis technique for AMR-WB was described by Lefebvre et al in [7].

In [13] Chen et al describes a multimedia application that uses multi rate audio capabilities to adapt the total rate and also the actually used compressing schemes based on information from a slow (1 sec) feedback channel. In addition Chen et al extends the audio application with a very low rate base layer that uses text, as a redundant parameter, to be able to provide speech synthesis for really severe error conditions.

Audio Scalability

Basically, audio scalability can be achieved by:

Changing the quantization of the signal, i.e. SNR-like scalability.

Extending or tightening the bandwidth of the signal.

Dropping audio channels (e.g., mono consist of 1 channel, stereo 2 channels, surround 5 channels)—(spatial scalability).

Currently available, fine-grained scalable audio codec is the AAC-BSAC (Advanced Audio Coding-Bit-Sliced Arithmetic Coding). It can be used for both audio and speech coding, it also allows for bit-rate scalability in small increments.

It produces a bit-stream, which can even be decoded if certain parts of the stream are missing. There is a minimum requirement on the amount of data that must be available to permit decoding of the stream. This is referred to as base-layer. The remaining set of bits corresponds to quality enhancements, hence their reference as enhancement-layers. The AAC-BSAC supports enhancement layers of around 1 Kbit/s/channel or smaller for audio signals.

"To obtain such fine grain scalability, a bit-slicing scheme is applied to the quantized spectral data. First the quantized spectral values are grouped into frequency bands, each of these groups containing the quantized spectral values in their binary representation. Then the bits of the group are processed in slices according to their significance and spectral content. Thus, first all most significant bits (MSB) of the quantized values in the group are processed and the bits are processed from lower to higher frequencies within a given slice. These bit-slices are then encoded using a binary arithmetic coding scheme to obtain entropy coding with minimal redundancy." [1]

"With an increasing number of enhancement layers utilized by the decoder, providing more LSB information refines quantized spectral data. At the same time, providing bit-slices of spectral data in higher frequency bands increases the audio bandwidth. In this way, quasi-continuous scalability is achievable." [1]

In other words, scalability can be achieved in a two-dimensional space. Quality, corresponding to a certain signal bandwidth, can be enhanced by transmitting more LSBs, or the bandwidth of the signal can be extended by providing more bit-slices to the receiver. Moreover, a third dimension of scalability is available by adapting the number of channels available for decoding. For example, a surround audio (5 channels) could be scaled down to stereo (2 channels) which, on the other hand, can be scaled to mono (1 channels) if, e.g., transport conditions make it necessary.

Perceptual Models for Audio Coding

To achieve the best perceived quality at a given bitrate for an audio coding system, one must consider the properties of the human auditory system. The purpose is to focus the resources to the parts of the sound which will be scrutinized, while saving resources where auditory perception is dull. The properties of the human auditory system have been documented in various listening tests, whose results have been used in the derivation of perceptual models.

The application of perceptual models in audio coding can be implemented in different ways. One method is to perform the bit allocation of the coding parameters in a way that corresponds to perceptual importance. In a transform domain codec, such as e.g. MPEG-1/2 Layer III, this is implemented by allocating bits in the frequency domain to different sub bands according to their perceptual importance. Another method is to perform a perceptual weighting, or filtering, in order to emphasize the perceptually important frequencies of the signal. The emphasis guarantees more resources will be allocated in a standard MMSE encoding technique. Yet another way is to perform perceptual weighting on the residual error signal after the coding. By minimizing the perceptually weighted error, the perceptual quality is maximized with respect to the model. This method is commonly used in e.g. CELP speech codecs.

Stereo Coding or Multi-Channel Coding

A general example of an audio transmission system using multi-channel (i.e. at least two input channels) coding and decoding is schematically illustrated in FIG. 2. The overall system basically comprises a multi-channel audio encoder 100 and a transmission module 10 on the transmitting side, and a receiving module 20 and a multi-channel audio decoder 200 on the receiving side.

The simplest way of stereophonic or multi-channel coding of audio signals is to encode the signals of the different channels separately as individual and independent signals, as illustrated in FIG. 3. However, this means that the redundancy among the plurality of channels is not removed, and that the bit-rate requirement will be proportional to the number of channels.

Another basic way used in stereo FM radio transmission and which ensures compatibility with legacy mono radio receivers is to transmit a sum signal (mono) and a difference signal (side) of the two involved channels.

State-of-the art audio codecs such as MPEG-1/2 Layer III and MPEG-2/4 AAC make use of so-called joint stereo coding. According to this technique, the signals of the different channels are processed jointly rather than separately and individually. The two most commonly used joint stereo coding techniques are known as ‘Mid/Side’ (M/S) Stereo and intensity stereo coding which usually are applied on sub-bands of the stereo or multi-channel signals to be encoded.

M/S stereo coding is similar to the described procedure in stereo FM radio, in a sense that it encodes and transmits the sum and difference signals of the channel sub-bands and thereby exploits redundancy between the channel sub-bands. The structure and operation of a coder based on M/S stereo coding is described, e.g., in U.S. Pat. No. 5,285,498 by J. D. Johnston.

Intensity stereo on the other hand is able to make use of stereo irrelevancy. It transmits the joint intensity of the channels (of the different sub-bands) along with some location information indicating how the intensity is distributed among the channels. Intensity stereo does only provide spectral magnitude information of the channels, while phase information is not conveyed. For this reason and since temporal inter-channel information (more specifically the inter-channel time difference) is of major psycho-acoustical relevancy particularly at lower frequencies, intensity stereo can only be used at high frequencies above e.g. 2 kHz. An intensity stereo coding method is described, e.g., in European Patent 0497413 by R. Veldhuis et al.

A recently developed stereo coding method is described, e.g., in a conference paper with title ‘Binaural cue coding applied to stereo and multi-channel audio compression’, 112$^{th}$ AES convention, May 2002, Munich (Germany) by C. Faller et al. This method is a parametric multi-channel audio coding method. The basic principle of such parametric techniques is that at the encoding side the input signals from the N channels $c_1, c_2, \ldots c_N$ are combined to one mono signal m. The mono signal is audio encoded using any conventional monophonic audio codec. In parallel, parameters are derived from the channel signals, which describe the multi-channel image. The parameters are encoded and transmitted to the decoder, along with the audio bit stream. The decoder first decodes the mono signal m' and then regenerates the channel signals $c_1', c_2', \ldots c_N'$, based on the parametric description of the multi-channel image.

The principle of the binaural cue coding (BCC[14]) method is that it transmits the encoded mono signal and so-called BCC parameters. The BCC parameters comprise coded inter-channel level differences and inter-channel time differences for sub-bands of the original multi-channel input signal. The decoder regenerates the different channel signals by applying sub-band-wise level and phase adjustments of the mono signal based on the BCC parameters. The advantage over e.g. M/S or intensity stereo is that stereo information comprising temporal inter-channel information is transmitted at much lower bit rates.

Another technique, described in U.S. Pat. No. 5,434,948 by C. E. Holt et al. uses the same principle of encoding of the mono signal and side information. In this case, side information consists of predictor filters and optionally a residual signal. The predictor filters, estimated by the LMS algorithm, when applied to the mono signal allow the prediction of the multi-channel audio signals. With this technique one is able to reach very low bit rate encoding of multi-channel audio sources, however at the expense of a quality drop.

The basic principles of parametric stereo coding are illustrated in FIG. 4, which displays a layout of a stereo codec, comprising a down-mixing module 120, a core mono codec 130, 230 and a parametric stereo side information encoder/decoder 140, 240. The down-mixing transforms the multi-channel (in this case stereo) signal into a mono signal. The objective of the parametric stereo codec is to reproduce a stereo signal at the decoder given the reconstructed mono signal and additional stereo parameters.

In International Patent Application, published as WO 2006/091139, a technique for adaptive bit allocation for multi-channel encoding is described. It utilises at least two encoders, where the second encoder is a multistage encoder. Encoding bits are adaptively allocated among the different stages of the second multi-stage encoder based on multi-channel audio signal characteristics.

Finally, for completeness, a technique is to be mentioned that is used in 3D audio. This technique synthesizes the right and left channel signals by filtering sound source signals with so-called head-related filters. However, this technique requires the different sound source signals to be separated and can thus not generally be applied for stereo or multi-channel coding.

Traditional parametric multi-channel or stereo encoding solutions aim to reconstruct a stereo or multi-channel signal from a mono down-mix signal using a parametric representation of the channel relations. If the quality of the coded down-mix signal is low this will also be reflected in the end result, regardless of the amount of resources spent on the stereo signal parameters.

SUMMARY

The present invention overcomes these and other drawbacks of the prior art arrangements.

The invention generally relates to an overall encoding procedure and associated decoding procedure. The encoding procedure involves at least two signal encoding processes operating on signal representations of a set of audio input channels. A basic idea of the present invention is to use local synthesis in connection with a first encoding process to generate a locally decoded signal, including a representation of the encoding error of the first encoding process, and apply this locally decoded signal as input to a second encoding process.

The overall encoding procedure generates at least two residual encoding error signals from one or both of the first and second encoding processes, primarily from the second encoding process, but optionally from the first and second encoding processes together. The residual error signals are then subjected to compound residual encoding in a further encoding process, preferably based on correlation between the residual error signals. In this process, perceptual measures may also be taken into account.

Since the locally decoded signal is used as input to the second encoding process it can always be guaranteed that the compound residual includes representations of the encoding errors of both the first and second encoding processes. By exploiting the correlation between the residual error signals, a highly resource-effective overall encoding of the audio input can be achieved with the possibility of improved quality.

From a hardware perspective, the invention relates to an encoder and an associated decoder. The overall encoder basically comprises at least two encoders for encoding different representations of input channels. Local synthesis in connection with a first encoder generates a locally decoded signal, and this locally decoded signal is applied as input to a second encoder. The overall encoder is also operable for generating at least two residual encoding error signals from the first and/or second encoders, primarily from the second encoder, but optionally from both the first and second encoders. The overall encoder also comprises a compound residual encoder for compound error analysis of the residual error signals, preferably based on correlation between the residual error signals, transformation and subsequent quantization.

If a local synthesis cannot be extracted from the first encoder, a decoder corresponding to the first encoder can be implemented and used on the encoding side to produce a local synthesis within the overall encoding procedure. This basically means that local synthesis can be accomplished internally within the first encoder or alternatively by a dedicated decoder implemented on the encoding side in connection with the first encoder.

More particularly, the decoding mechanism basically involves at least two decoding processes, including a first decoding process and a second decoding process, operating on incoming bit streams to reconstruct a multi-channel audio signal. Compound residual decoding is then performed in a further decoding process based on an incoming residual bit stream representative of uncorrelated residual error signal information to generate correlated residual error signals. The correlated residual error signals are then added to decoded channel representations from at least one of the first and second decoding processes, including at least said second decoding process, to generate a decoded multi-channel output signal.

In yet another aspect, the invention relates to an improved audio transmission system based on the proposed audio encoder and decoder.

Other advantages offered by the invention will be appreciated when reading the below description of embodiments of the invention.

BRIEF DESCRIPTION OF THE DRAWINGS

The invention, together with further objects and advantages thereof, will be best understood by reference to the following description taken together with the accompanying drawings, in which.

DETAILED DESCRIPTION OF EMBODIMENTS

Figure 1:
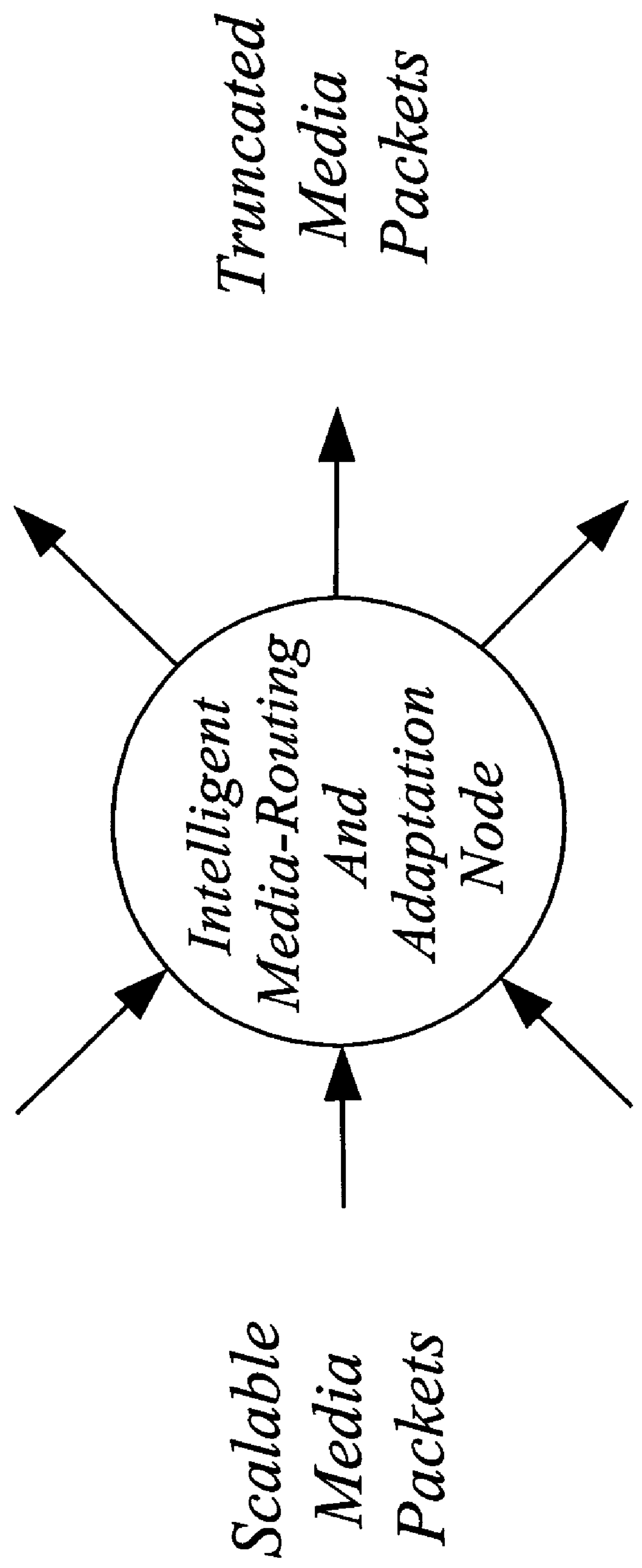
FIG. 1 illustrates an example of a dedicated network entity for media adaptation.
Figure 2:
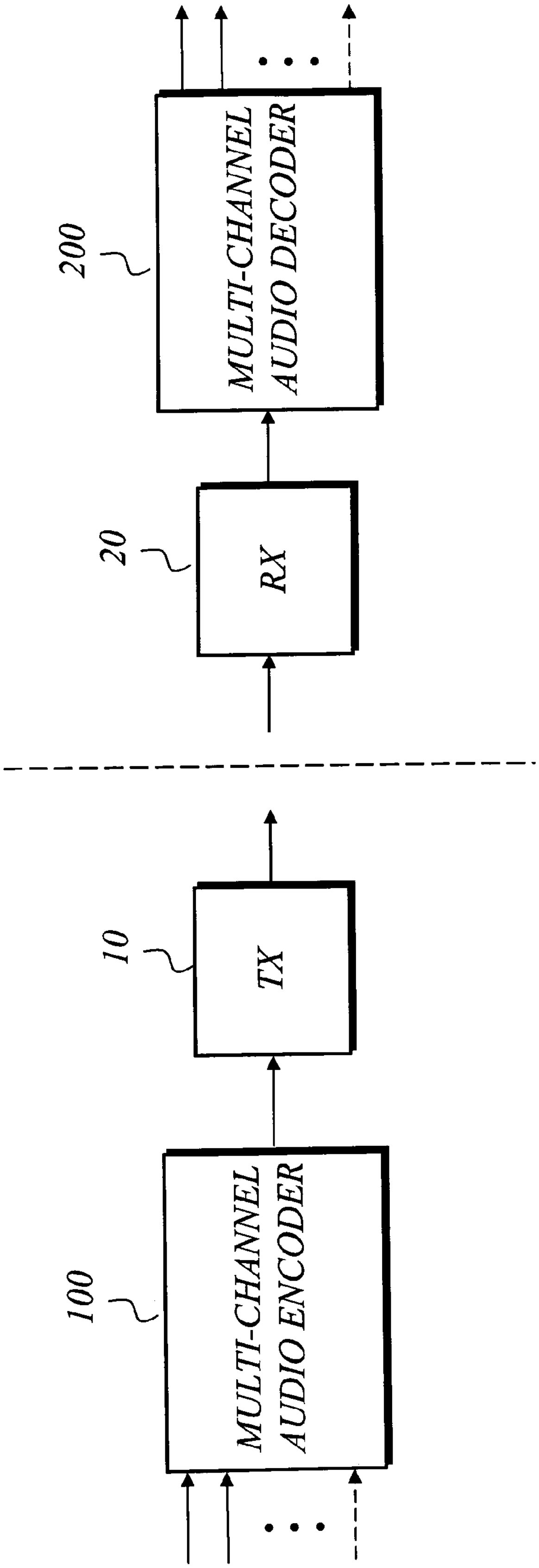
FIG. 2 is a schematic block diagram illustrating a general example of an audio transmission system using multi-channel coding and decoding.
Figure 3:
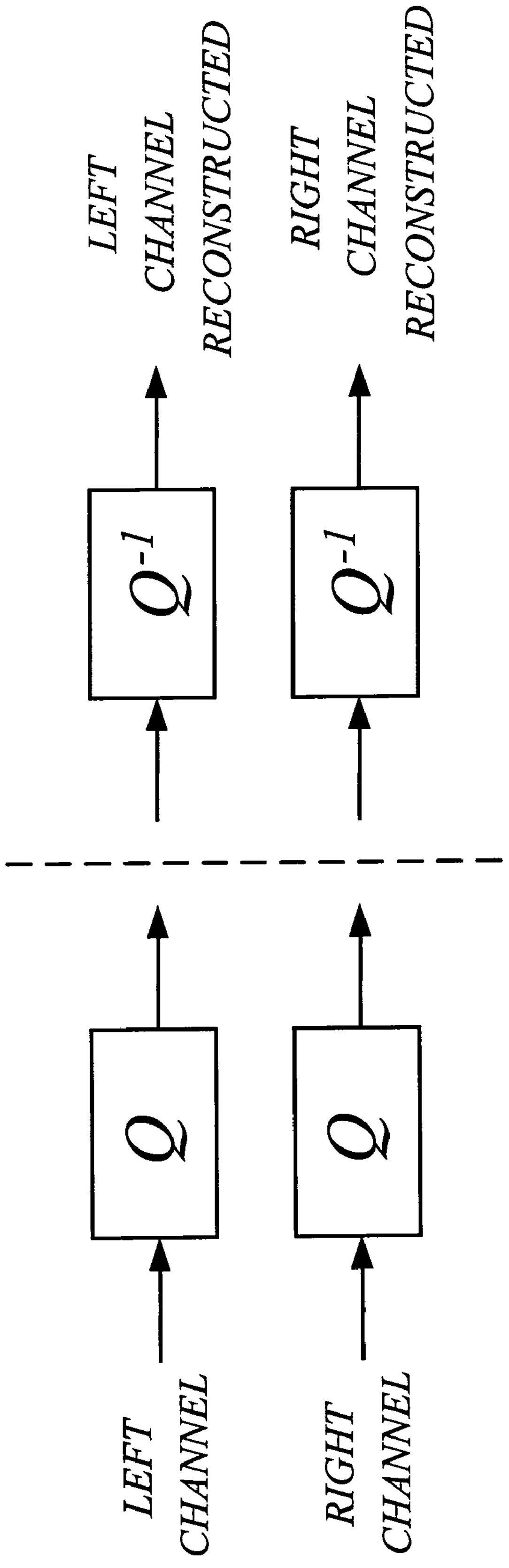
FIG. 3 is a schematic diagram illustrating how signals of different channels are encoded separately as individual and independent signals.
Figure 4:
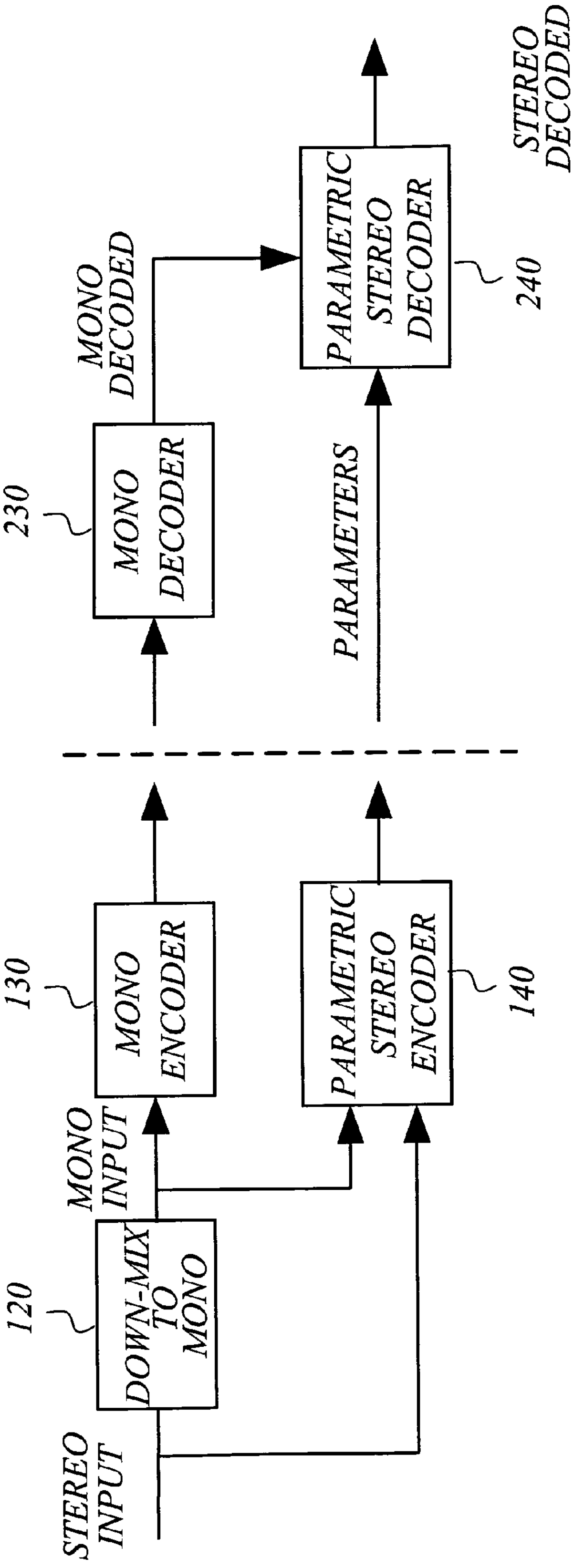
FIG. 4 is a schematic block diagram illustrating the basic principles of parametric stereo coding.

Throughout the drawings, the same reference characters will be used for corresponding or similar elements.

The invention relates to multi-channel (i.e. at least two channels) encoding/decoding techniques in audio applications, and particularly to stereo encoding/decoding in audio transmission systems and/or for audio storage. Examples of possible audio applications include phone conference systems, stereophonic audio transmission in mobile communication systems, various systems for supplying audio services, and multi-channel home cinema systems.

Figure 13:
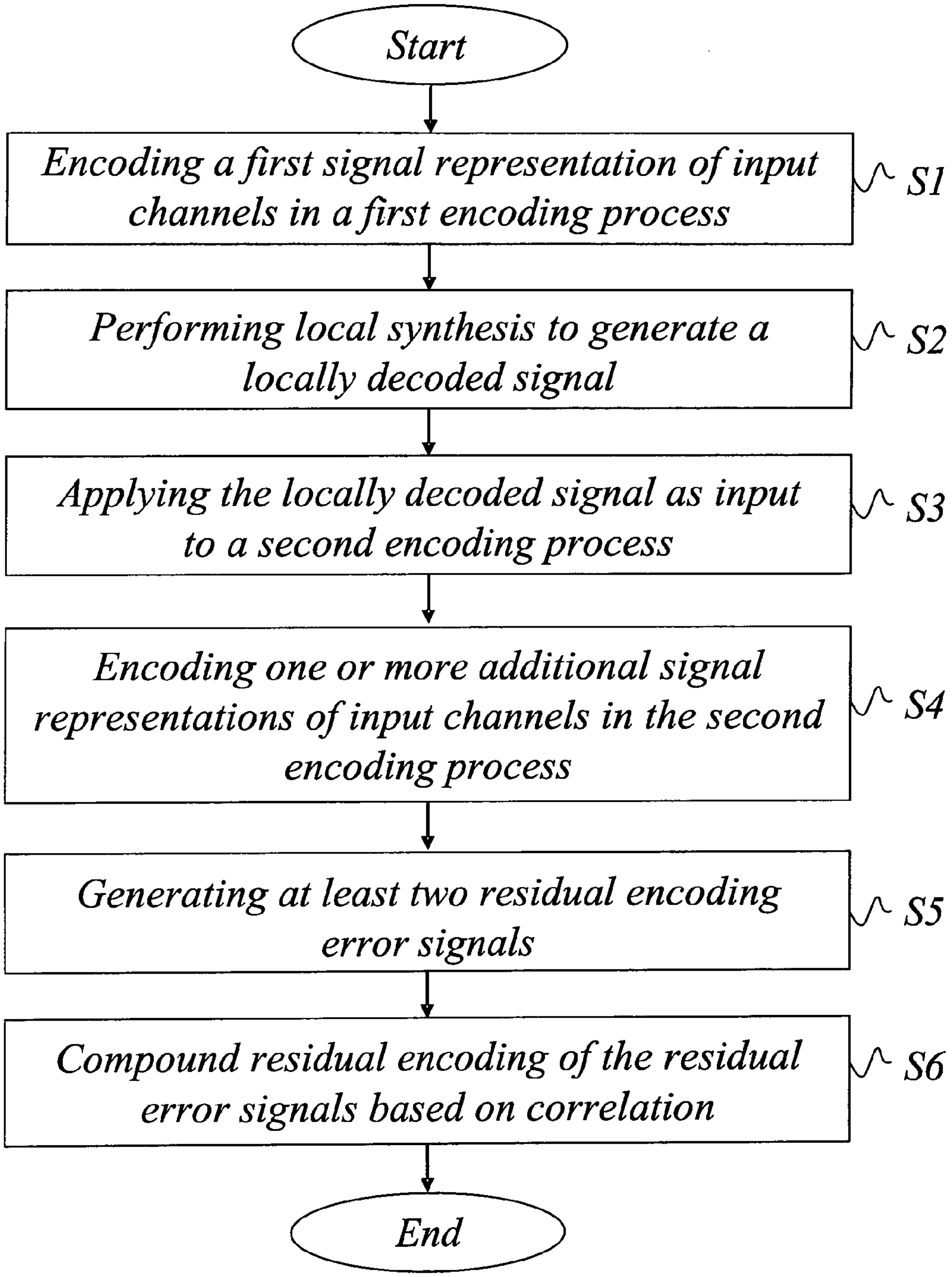
FIG. 13 is a schematic flow diagram of an audio encoding method according to an exemplary embodiment of the invention.

With reference to the schematic exemplary flow diagram of FIG. 13, it can be seen that the invention preferably relies on the principle of encoding a first signal representation of a set of input channels in a first signal encoding process (S1), and encoding at least one additional signal representation of at least part of the input channels in a second signal encoding process (S4). Briefly, a basic idea is to generate a so-called locally decoded signal through local synthesis (S2) in connection with the first encoding process. The locally decoded signal includes a representation of the encoding error of the first encoding process. The locally decoded signal is applied as input (S3) to the second encoding process. The overall encoding procedure generates at least two residual encoding error signals (S5) from one or both of the first and second encoding processes, primarily from the second encoding process, but optionally from the first and second encoding processes taken together. The residual error signals are then processed in a compound residual encoding process (S6) including compound error analysis based on correlation between the residual error signals.

For example, the first encoding process may be a main encoding process such as a mono encoding process and the second encoding process may be an auxiliary encoding process such as a stereo encoding process. The overall encoding procedure generally operates on at least two (multiple) input channels, including stereophonic encoding as well as more complex multi-channel encoding.

In a preferred exemplary embodiment of the invention, the compound residual encoding process may include decorrelation of the correlated residual error signals by means of a suitable transform to produce corresponding uncorrelated error components, quantization of at least one of the uncorrelated error components, and quantization of a representation of the transform, as will be exemplified and explained in more detail later on. As will be seen later on, the quantization of the error component(s) may for example involve bit allocation among the uncorrelated error components based on the corresponding energy levels of the error components.

Figure 14:
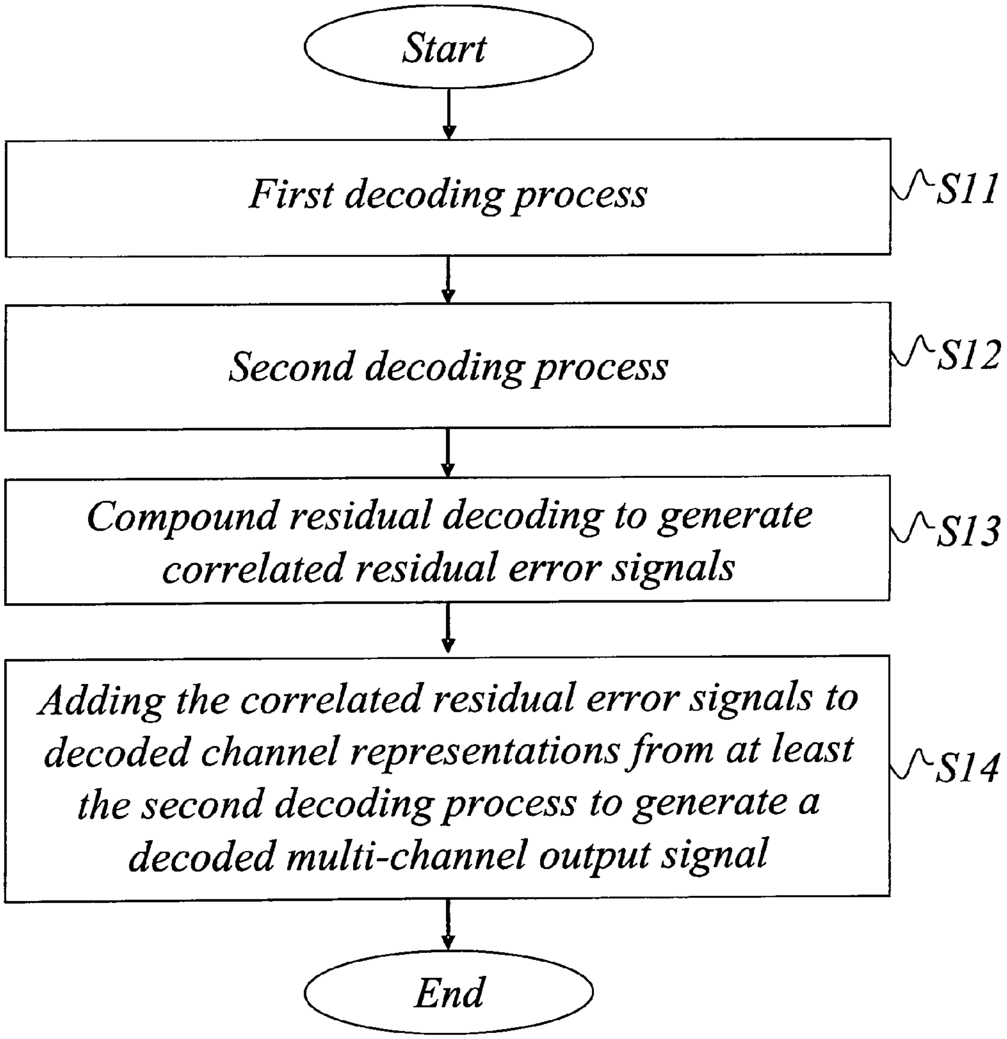
FIG. 14 is a schematic flow diagram of an audio decoding method according to an exemplary embodiment of the invention.

With reference to the schematic exemplary flow diagram of FIG. 14, the corresponding decoding process preferably involves at least two decoding processes, including a first decoding process (S11) and a second decoding process (S12) operating on incoming bit streams for the reconstruction of a multi-channel audio signal. Compound residual decoding is performed in a further decoding process (S13) based on an incoming residual bit stream representative of uncorrelated residual error signal information to generate correlated residual error signals. The correlated residual error signals are then added (S14) to decoded channel representations from at least one of the first and second decoding processes, including at least the second decoding process, to generate the multi-channel audio signal.

In a preferred exemplary embodiment of the invention, the compound residual decoding may include residual dequantization based on the incoming residual bit stream, and orthogonal signal substitution and inverse transformation based on an incoming transform bit stream to generate the correlated residual error signals.

The inventors have recognized that the multi-channel or stereo signal properties are likely to change with time. In some parts of the signal the channel correlation is high, meaning that the stereo image is narrow (mono-like) or can be represented with a simple panning left or right. This situation is common in for example teleconferencing applications since there is likely only one person speaking at a time. For such cases less resource is needed to render the stereo image and excess bits are better spent on improving the quality of the mono signal.

For a better understanding of the invention, it may be useful to begin by describing examples of the invention in relation to stereo encoding and decoding, and later on continue with a more general multi-channel description.

Figure 5:
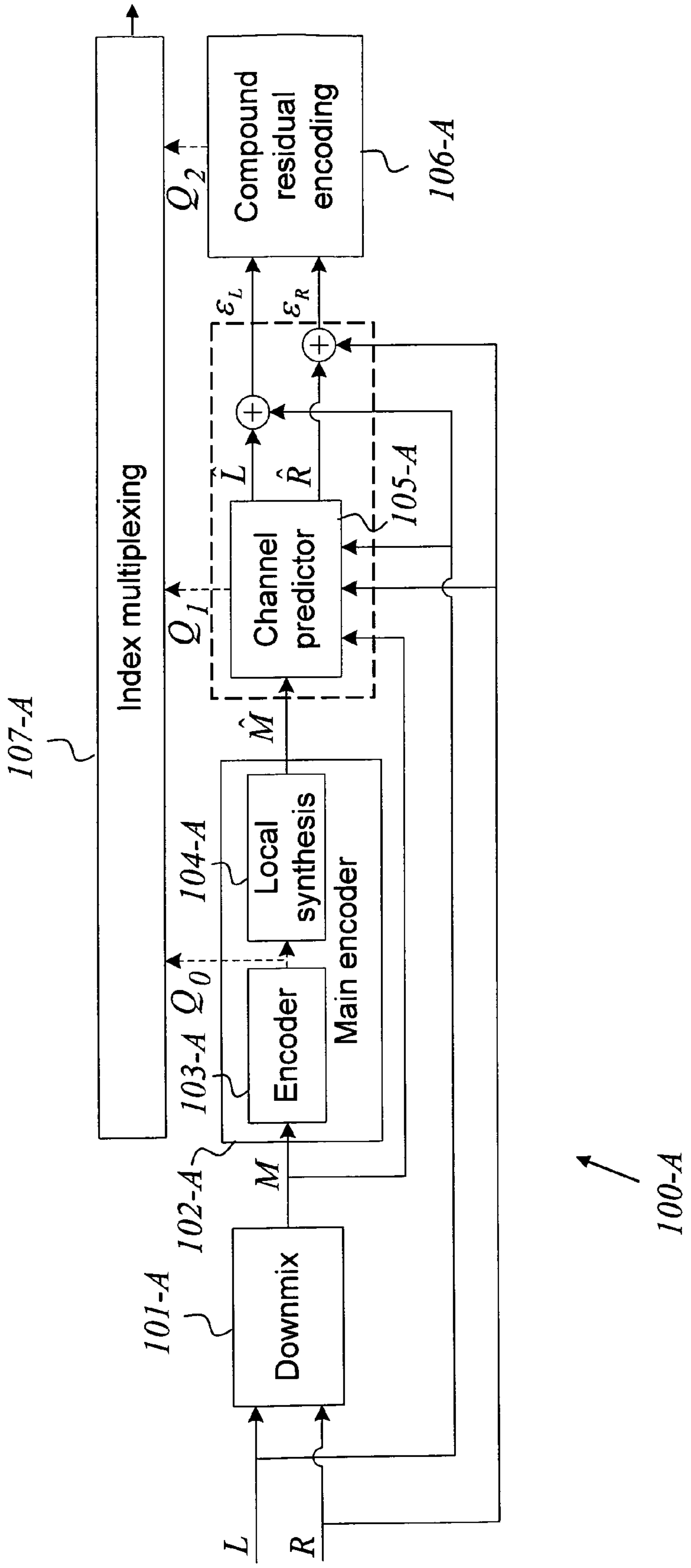
FIG. 5 is a schematic block diagram of a stereo coder according to an exemplary embodiment of the invention.

FIG. 5 is a schematic block diagram of a stereo coder according to an exemplary embodiment of the invention.

The invention is based on the idea of implicitly refining both the down-mix quality as well as the stereo spatial quality in a consistent and unified way. The embodiment of the invention illustrated in FIG. 5 is intended to be part of a scalable speech codec as a stereo enhancement layer. The exemplary stereo coder 100-A of FIG. 5 basically includes a down-mixer 101-A, a main encoder 102-A, a channel predictor 105-A, a compound residual encoder 106-A and an index multiplexing unit 107-A. The main encoder 102-A includes an encoder unit 103-A and a local synthesizer 104-A. The main encoder 102-A implements a first encoding process, and the channel predictor 105-A implements a second encoding process. The compound residual encoder 106-A implements a further complementary encoding process. The underlying codec layers process mono signals which means the input stereo channels must be down-mixed to a single channel. A standard way of down-mixing is to simply add the signals together:

$$M(n)=\frac{L(n)+R(n)}{2}$$

This type of down-mixing is applied directly on the time domain signal indexed by n. In general, the down-mix is a process of reducing the number of input channels p to a smaller number of down-mix channels q. The down-mix can be any linear or non-linear combination of the input channels, performed in temporal domain or in frequency domain. The down-mix can be adapted to the signal properties.

Other types of down-mixing use an arbitrary combination of the Left and Right channels and this combination may also be frequency dependent.

In exemplary embodiments of the invention the stereo encoding and decoding is assumed to be done on a frequency band or a group of transform coefficients. This assumes that the processing of the channels is done in frequency bands. An arbitrary down-mix with frequency dependent coefficients can be written as:

$$M_b(m)=\alpha_b L_b(m)+\beta_b R_b(m)$$

Here the index m indexes the samples of the frequency bands. Without departing from the spirit of the invention, more elaborate down-mixing schemes may be used with adaptive and time variant weighting coefficients $\alpha_b$ and $\beta_b$.

Hereafter, when referring to the signals L, R and M without indices n, m or b, we typically describe general concepts which can be implemented using either time domain or frequency domain representations of the signals. However, when referring to time domain signals it is common to use lower case letters. In the following text, we will mainly use lower case l(n), r(n) and m(n) when explicitly referring to exemplary time domain signals at sample index n.

Once the mono channel has been produced it is fed to the lower layer mono codec, generally referred to as the main encoder 102-A. The main encoder 102-A encodes the input signal M to produce a quantized bit stream ($Q_0$) in the encoder unit 103-A, and also produces a locally decoded mono signal $\hat{M}$ in the local synthesizer 104-A. The stereo encoder then uses the locally decoded mono signal to produce a stereo signal.

Before the following processing stages, it is beneficial to employ perceptual weighting. This way, perceptually important parts of the signal will automatically be encoded with higher resolution. The weighting will be reversed in the decoding stage. In this exemplary embodiment, the main encoder is assumed to have a perceptual weighting filter which is extracted and reused for the locally decoded mono signal and well as the stereo input channels L and R. Since the perceptual model parameters are transmitted with the main encoder bitstream, no additional bits are needed for the perceptual weighting. It is also possible to use a different model, e.g. one that takes binaural audio perception into account. In general, different weighting can be applied for each coding stage if it is beneficial for the encoding method of that stage.

The stereo encoding scheme/encoder preferably includes two stages. A first stage, here referred to as the channel predictor 105-A, handles the correlated components of the stereo signal by estimating correlation and providing a prediction of the left and right channels $\hat{L}$ and $\hat{R}$, while using the locally decoded mono signal $\hat{M}$ as input. In the process, the channel predictor 105-A produces a quantized bit stream ($Q_1$). A stereo prediction error $\epsilon_L$ and $\epsilon_R$ for each channel is calculated by subtracting the prediction $\hat{L}$ and $\hat{R}$ from the original input signals L and R. Since the prediction is based on the locally decoded mono signal $\hat{M}$, the prediction residual will contain both the stereo prediction error and the coding error from the mono codec. In a further stage, here referred to as the compound residual encoder 106-A, the compound error signal is further analyzed and quantized ($Q_2$), allowing the encoder to exploit correlation between the stereo prediction error and the mono coding error, as well as sharing resources between the two entities.

The quantized bit streams ($Q_0$, $Q_1$, $Q_2$) are collected by the index multiplexing unit 107-A for transmission to the decoding side.

The two channels of a stereo signal are often very alike, making it useful to apply prediction techniques in stereo coding. Since the decoded mono channel $\hat{M}$ will be available at the decoder, the objective of the prediction is to reconstruct the left and right channel pair from this signal.

$$\begin{bmatrix} \hat{L} \\ \hat{R} \end{bmatrix} = f(\hat{M})$$

Subtracting the prediction from the original input signal at the encoder will form an error signal pair:

$$\begin{bmatrix} \varepsilon_L \\ \varepsilon_R \end{bmatrix} = \begin{bmatrix} L \\ R \end{bmatrix} - \begin{bmatrix} \hat{L} \\ \hat{R} \end{bmatrix}$$

For an MMSE perspective, the optimal prediction is obtained by minimizing the error vector $[\epsilon_L\ \epsilon_R]^T$. This can be solved in time domain by using a time varying FIR-filter:

$$\begin{bmatrix} \hat{l}(n) \\ \hat{r}(n) \end{bmatrix} = \begin{bmatrix} \sum_{i=0}^{N-1} h_{L,t}\hat{m}(n-i) \\ \sum_{i=0}^{N-1} h_{R,t}\hat{m}(n-i) \end{bmatrix}$$

The equivalent operation in frequency domain can be written:

$$\begin{bmatrix} \hat{L}_b(k) \\ \hat{R}_b(k) \end{bmatrix} = \begin{bmatrix} H_L(b,k)\hat{M}_b(k) \\ H_R(b,k)\hat{M}_b(k) \end{bmatrix}$$

where $H_L(b,k)$ and $H_R(b,k)$ are the frequency responses of the filters $h_L$ and $h_R$ for coefficient k of the frequency band b, and $\hat{L}_b(k)$, $\hat{R}_b(k)$ and $\hat{M}_b(k)$ are the transformed counterparts of the time signals $\hat{l}(n)$, $\hat{r}(n)$ and $\hat{m}(n)$.

Among the advantages of frequency domain processing is that it gives explicit control over the phase, which is relevant to stereo perception [14]. In lower frequency regions, phase information is highly relevant but can be discarded in the high frequencies. It can also accommodate a sub-band partitioning that gives a frequency resolution which is perceptually relevant. The drawbacks of frequency domain processing are the complexity and delay requirements for the time/frequency transformations. In cases where these parameters are critical, a time domain approach is desirable.

For the targeted codec according to this exemplary embodiment of the invention, the top layers of the codec are SNR enhancement layers in MDCT domain. The delay requirements for the MDCT are already accounted for in the lower layers and the part of the processing can be reused. For this reason, the MDCT domain is selected for the stereo processing. Although well suited for transform coding, it has some drawbacks in stereo signal processing since it does not give explicit phase control. Further, the time aliasing property of MDCT may give unexpected results since adjacent frames are inherently dependent. On the other hand, it still gives good flexibility for frequency dependent bit allocation.

For the stereo processing, the frequency spectrum is preferably divided into processing bands. In AAC parametric stereo, the processing bands are selected to match the critical bandwidths of human auditory perception. Since the available bitrate is low the selected bands are fewer and wider, but the bandwidths are still proportional to the critical bands. Denoting the band b, the prediction can be written:

$$\begin{bmatrix} \hat{L}_b(k,m) \\ \hat{R}_b(k,m) \end{bmatrix} = w_b(m)\hat{M}_b(k,m) = \begin{bmatrix} w_{b,L}(m) \\ w_{b,R}(m) \end{bmatrix}\hat{M}_b(k,m)$$

Here, k denotes the index of the MDCT coefficient in the band b and m denotes the time domain frame index.

The solution for $w_b(m)$ which is close to $[L_b\ R_b]^T$ in the mean square error sense is:

$$w_b(m) = \begin{bmatrix} E\left[L_b(m)\hat{M}_b^*(m)\right] \\ E\left[R_b(m)\hat{M}_b^*(m)\right] \end{bmatrix} \Big/ E\left[\hat{M}_b(m)\hat{M}_b^*(m)\right]$$

Here E[.] denotes the averaging operator and is defined as an example for an arbitrary time frequency variable as an averaging over a predefined time frequency region. For example:

$$E[X_b(m)] = \frac{1}{(2N_{Time}+1)\cdot Sizeof(FrequencyBand(b))} \sum_{i=-N_{Time}}^{N_{Time}} \sum_{k\in FrequencyBand(b)} X_b(k, m-i)$$

The averaging may also extend beyond the frequency band b.

The use of the coded mono signal in the derivation of the prediction parameters includes the coding error in the calculation. Although sensible from an MMSE perspective, this causes instability in the stereo image that is perceptually annoying. For this reason, the prediction parameters are based on the unprocessed mono signal, excluding the mono error from the prediction.

$$w_b'(m) = \begin{bmatrix} w_{b,L}'(m) \\ w_{b,R}'(m) \end{bmatrix} = \begin{bmatrix} E[L_b(m)M_b^*(m)] \\ E[R_b(m)M_b^*(m)] \end{bmatrix} \Big/ E[M_b(m)M_b^*(m)]$$

To facilitate low bitrate encoding of the prediction parameters, further simplification is made. Since the encoding is performed in MDCT domain, the signals will be real valued, and hence so will the predictors $w_b'(m)$. The predictors are joined into a single panning angle $\phi_b(m)$:

$$\varphi_b(m) = \tan^{-1}\left(\frac{w'_{b,R}(m)}{w'_{b,L}(m)}\right)$$

Figure 7A:
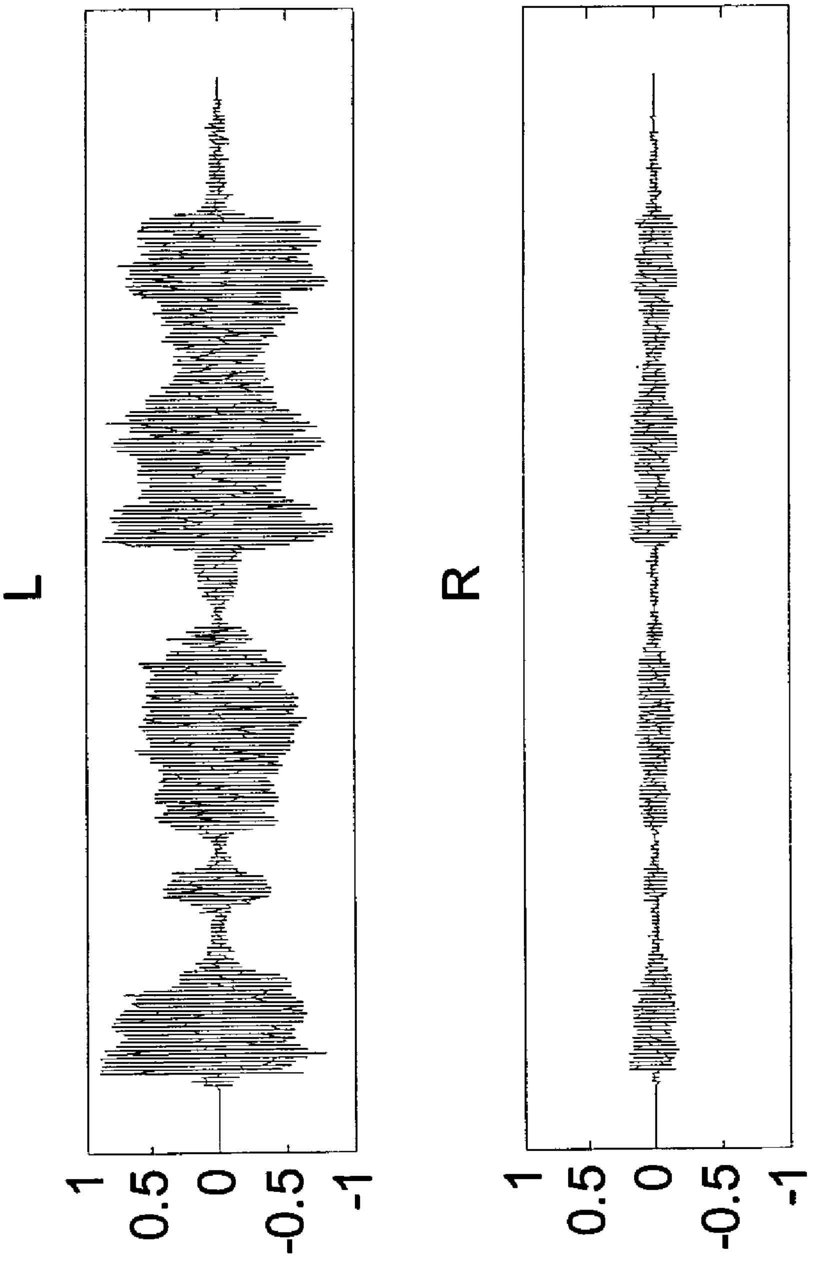
FIGS. 7A-B are schematic diagrams illustrating how stereo panning can be represented as an angle in the L/R plane.
Figure 7B:
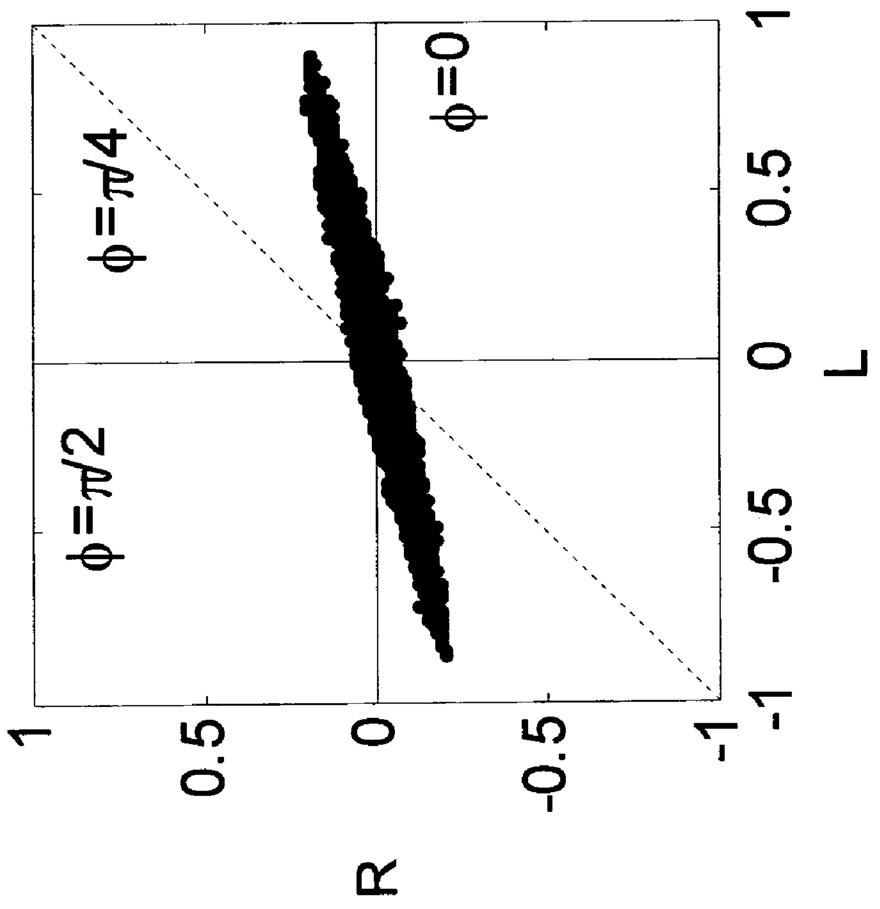

This angle has an interpretation in the L/R signal space, as illustrated in FIGS. 7A-B. The angle is limited to the range $[0,\pi/2]$. An angle in the range $[\pi/2,\pi]$ would mean the channels are anti-correlated, which is an unlikely situation for most stereo recordings. Stereo panning can thus be represented as an angle in the L/R plane.

FIG. 7B is a scatter-plot where each dot represents a stereo sample at a given time instant n(L(n),R(n)). The scatter-plot shows the samples spread along a thick line with a certain angle. If the channels would have been equal L=R, the dots would be spread over a single line on the angle $\phi=\pi/4$. Now, since the sound is panned slightly to the left, the point distribution is leaning towards smaller values of $\phi$.

Figure 6:
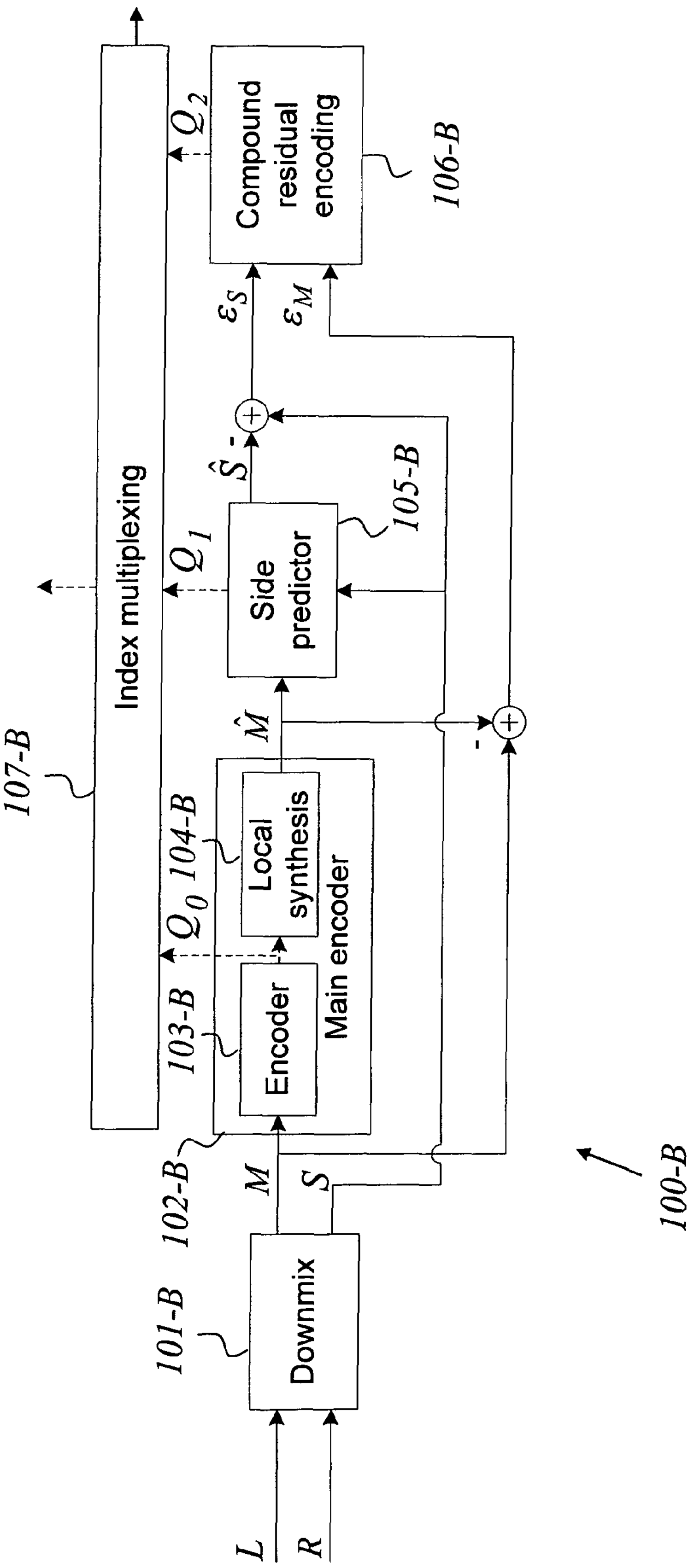
FIG. 6 is a schematic block diagram of a stereo coder according to another exemplary embodiment of the invention.

FIG. 6 is a schematic block diagram of a stereo coder according to another exemplary embodiment of the invention. The exemplary stereo coder 100-B of FIG. 6 basically includes a down-mixer 101-B, a main encoder 102-B, a so-called side predictor 105-B, a compound residual encoder 106-B and an index multiplexing unit 107-B. The main encoder 102-B includes an encoder unit 103-B and a local synthesizer 104-B. The main encoder 102-B implements a first encoding process, and the side predictor 105-B implements a second encoding process. The compound residual encoder 106-B implements a further complementary encoding process. In stereo coding, channels are usually represented by the left and the right signals l(n), r(n). However, an equivalent representation is the mono signal m(n) (a special case of the main signal) and the side signal s(n). Both representations are equivalent and are normally related by the traditional matrix operation:

$$\begin{bmatrix} m(n) \\ s(n) \end{bmatrix} = \frac{1}{2}\begin{bmatrix} 1 & 1 \\ 1 & -1 \end{bmatrix}\begin{bmatrix} l(n) \\ r(n) \end{bmatrix}.$$

In the particular example illustrated in FIG. 6, so-called inter-channel prediction (ICP) is employed in the side predictor 105-B to represent the side signal s(n) by an estimate ŝ(n), which may be obtained by filtering the mono signal m(n) through a time-varying FIR filter H(z) having N filter coefficients $h_t(i)$:

$$\hat{s}(n) = \sum_{i=0}^{N-1} h_t(i)m(n-i)$$

The ICP filter derived at the encoder may for example be estimated by minimizing the mean squared error (MSE), or a related performance measure, for instance psycho-acoustically weighted mean square error, of the side signal prediction error. The MSE is typically given by:

$$\xi(h) = \sum_{n=0}^{L-1} MSE(n, h) = \sum_{n=0}^{L-1}\left(s(n) - \sum_{i=0}^{N-1} h(i)m(n-i)\right)^2$$

where L is the frame size and N is the length/order/dimension of the ICP filter. Simply speaking, the performance of the ICP filter, thus the magnitude of the MSE, is the main factor determining the final stereo separation. Since the side signal describes the differences between the left and right channels, accurate side signal reconstruction is essential to ensure a wide enough stereo image.

The mono signal m(n) is encoded and quantized ($Q_0$) by the encoder 103-B of the main encoder 102-B for transfer to the decoding side as usual. The ICP module of the side predictor 105-B for side signal prediction provides a FIR filter representation H(z) which is quantized ($Q_1$) for transfer to the decoding side. Additional quality can be gained by encoding and/or quantizing ($Q_2$) the side signal prediction error $\epsilon_s$. It should be noted that when the residual error is quantized, the coding can no longer be referred to as purely parametric, and therefore the side encoder is referred to as a hybrid encoder. In addition, a so-called mono signal encoding error $\epsilon_m$ is generated and analyzed together with the side signal prediction error $\epsilon_s$ in the compound residual encoder 106-B. This encoder model is more or less equivalent to that described in connection with FIG. 5.

Compound Error Encoding

In an exemplary embodiment of the invention, an analysis is conducted on the compound error signal, aiming to extract inter-channel correlation or other signal dependencies. The result of the analysis is preferably used to derive a transform performing a decorrelation/orthogonalization of the channels of the compound error.

In an exemplary embodiment, when the error components have been orthogonalized, the transformed error components can be quantized individually. The energy levels of the transformed error "channels" are preferably used in performing a bit allocation among the channels. The bit allocation may also take in account perceptual importance or other weighting factors.

The stereo prediction is subtracted from the original input signals, producing a prediction residual $[\epsilon_L \epsilon_R]^T$. This residual contains both the stereo prediction error and the mono coding error. Assume the mono signal can be written as a sum of the original signal and the coding noise:

$$\hat{M}=M+\epsilon_M$$

The prediction error for band b can then be written as (omitting the frame index m and the band coefficient k):

$$\begin{bmatrix} \varepsilon_{b,L} \\ \varepsilon_{b,R} \end{bmatrix} = \begin{bmatrix} L_b - \hat{L}_b \\ R_b - \hat{R}_b \end{bmatrix} = \begin{bmatrix} L_b - w_{b,L}\hat{M} \\ R_b - w_{b,R}\hat{M} \end{bmatrix} = \begin{bmatrix} L_b - w_{b,L}(M+\varepsilon_M) \\ R_b - w_{b,R}(M+\varepsilon_M) \end{bmatrix} = \begin{bmatrix} L_b - w_{b,L}M - w_{b,L}\varepsilon_M \\ R_b - w_{b,R}M - w_{b,R}\varepsilon_M \end{bmatrix}.$$

Here two error components can be identified. First, the stereo prediction error:

$$\begin{bmatrix} L_b - w_{b,L}M \\ R_b - w_{b,R}M \end{bmatrix}$$

which among other things contains the diffuse sound field components, i.e. components which have no correlation with the mono signal.

The second component is related to the mono coding error and is proportional to the coding noise on the mono signal:

$$-\begin{bmatrix} w_{b,L}\varepsilon_M \\ w_{b,R}\varepsilon_M \end{bmatrix}$$

Note that the mono coding error is distributed to the different channels using the panning factors.

These two sources of errors although seemingly independent and uncorrelated will make the two errors on the left and the right channels $$\left(\begin{bmatrix} \varepsilon_{b,L} \\ \varepsilon_{b,R} \end{bmatrix}\right)$$

correlated. The correlation matrix of the two errors can be derived as:

$$\begin{bmatrix} E[L_bL_b^*] - \frac{|E[L_b\hat{M}_b^*]|^2}{E[\hat{M}_b\hat{M}_b^*]} & E[L_bR_b^*] - \frac{E[L_b\hat{M}_b^*]E[R_b\hat{M}_b^*]}{E[\hat{M}_b\hat{M}_b^*]} \\ E[R_bL_b^*] - \frac{E[\hat{M}_bL_b^*][\hat{M}_bR_b^*]}{E[\hat{M}_b\hat{M}_b^*]} & E[R_bR_b^*] - \frac{|E[R_b\hat{M}_b^*]|^2}{E[\hat{M}_b\hat{M}_b^*]} \end{bmatrix}$$

This shows that ultimately the errors on the left and right channels are correlated. It is recognized that a separate encoding of the two errors is not optimal unless the two signals are uncorrelated. A good idea is therefore to employ correlation-based compound error encoding.

In a preferred exemplary embodiment, techniques like Principal Components Analysis (PCA) or similar transformation techniques can be used in this process PCA is a technique used to reduce multidimensional data sets to lower dimensions for analysis. Depending on the field of application, it is also named the discrete Karhunen-Loève Transform (or KLT).

KLT is mathematically defined as an orthogonal linear transformation that transforms the data to a new coordinate system such that the greatest variance by any projection of the data comes to lie on the first coordinate (called the first principal component), the second greatest variance on the second coordinate, and so on.

The KLT can be used for dimensionality reduction in a data set by retaining those characteristics of the data set that contribute most to its variance, by keeping lower-order principal components and ignoring higher-order ones. Such low-order components often contain the "most important" aspects of the data. But this is not necessarily the case, depending on the application.

In the above stereo encoding example, the residual errors can be decorrelated/orthogonalized by using a 2×2 Karhunen Loève Transform (KLT). This is a simple operation in this two dimensional case. The errors can therefore be decomposed as:

$$\begin{bmatrix} \varepsilon_{b,L}(k,m) \\ \varepsilon_{b,R}(k,m) \end{bmatrix} = H_b(m)\begin{bmatrix} z_b^1(k,m) \\ z_b^2(k,m) \end{bmatrix}$$

where $$H_b(m) = \begin{bmatrix} \cos(\theta_b(m)) & \sin(\theta_b(m)) \\ -\sin(\theta_b(m)) & \cos(\theta_b(m)) \end{bmatrix}$$

where is the KLT transform (i.e. rotation in the plane with an angle $\theta_b(m)$) and $z_b^1(k,m), z_b^2(k,m)$ are the two uncorrelated components with $E\lfloor z_b^1(m)z_b^{1*}(m)\rfloor > E\lfloor z_b^2(m)z_b^{2*}(m)\rfloor$.

With this representation, we have implicitly transformed the correlated residual errors into two uncorrelated sources of errors, one of which has an energy which is larger than the other component.

This representation provides implicitly a way to perform bit allocation for encoding the two components. Bits are preferably allocated to the uncorrelated components which has the largest variance. The second component can optionally be ignored if its energy is negligible or very low. This means that it is actually possible to quantize only a single one of the uncorrelated error components.

Different schemes of how to encode the two components, $z_b^1(k,m), z_b^2(k,m)$ can be implemented.

In an exemplary embodiment, the largest component $z_b^1(k,m)$ is quantized and encoded, by using for instance a scalar quantizer or a lattice quantizer. While the lowest component is ignored, i.e. zero bit quantization of the second component $z_k^2$ except for its energy which will be needed in the decoder in order to artificially simulate this component. In other words, the encoder is here configured for selecting a first error component and an indication of the energy of a second error component for quantization.

This embodiment is useful when the total bit budget does not allow an adequate quantization of both KLT components.

At the decoder, the $z_b^1(k, m)$ component is decoded, while the $z_b^2(k, m)$ components are simulated by using noise filling at the appropriate energy, the energy is set by using a gain computation module which adjusts the level to the one which is received. The gain can also be directly quantized and may use any prior art methods for gain quantization. The noise filling generates a noise component with the constraint of being decorrelated from $z_b^1(k, m)$ (which is available at the decoder in quantized form) and having the same energy as $z_b^2(k,m)$. The decorrelation constraint is important in order to preserve the energy distribution of the two residuals. In fact, any amount of correlation between the noise replacement and $z_b^1(k,m)$ will lead to a mismatch in correlation and will disturb the perceived balance on the two decoded channels and affects the stereo width.

In this particular example, the so-called residual bit stream thus includes a first quantized uncorrelated component and an indication of energy of a second uncorrelated component, and the so-called transform bit stream includes a representation of the KLT transform, and the first quantized uncorrelated component is decoded and the second uncorrelated component is simulated by noise filling at the indicated energy. The inverse KLT transformation is then based on the first decoded uncorrelated component and the simulated second uncorrelated component and the KLT transform representation to produce the correlated residual error signals.

In another embodiment, both encoding of $z_b^1(k,m)$, $z_b^2(k,m)$ is performed on the low frequency bands, while for the high frequency bands $z_b^2(k,m)$ is dropped and orthogonal noise filling is used only for the high frequency bands at the decoder.

FIGS. 9A-H are example scatter plots in L/R signal planes for a particular frame using eight bands. In the lower bands, the error is dominated by the side signal component. This indicates that the mono codec and stereo prediction has made a good stereo rendering. The higher bands show a dominating mono error. The oval circle shows the estimated sample distribution using the correlation values.

Besides encoding $z_b^1(k,m)$,$z_b^2(k,m)$, the KLT matrix (i.e. KLT rotation angle in the case of two channels) has to be encoded. Experimentally, it has been noted that the KLT angle is correlated with the previously defined panning angle $\phi_b(m)$. This is beneficial when encoding the KLT angle $\theta_b(m)$ to design a differential quantization, i.e. to quantize the difference $\theta_b(m)-\phi_b(m)$.

The creation of a compound or joint error space allows for further adaptation and optimization:

- By allowing an independent transform such as KLT for each frequency band, the scheme can apply different strategy for different frequencies. If the main (mono) codec shows poor performance for a certain frequency range, resources can be redirected to fix that range, while focusing on stereo rendering where the main (mono) codec has good performance (FIGS. 9A-H).
- By introducing a frequency weighting which depends on the binaural masking level difference (BMLD [14]). This frequency weighting may further emphasize one KLT component with respect to the other in order to take advantage of the masking properties of the human auditory system.

Variable Bit-Rate Parameter Encoding

In an exemplary embodiment of the invention, the parameters that preferably are transmitted to the decoder are the two rotation angles: the panning angle $\phi_b$ and the KLT angle $\theta_b$. One pair of angles is typically used for each subband, producing vector of panning angles $\phi_b$ and a vector of KLT angles $\theta_b$. For example, the elements of these vectors are individually quantized using a uniform scalar quantizer. A prediction scheme can then be applied to the quantizer indices. This scheme preferably has two modes which are evaluated and selected closed loop:

1. Time prediction: the predictor for each band is the index from the previous frame.
2. Frequency prediction: each index is quantized relative to the median index.

Mode 1 yields a good prediction when the frame-to-frame conditions are stable. In case of transitions or onsets, mode 2 may give a better prediction. The selected scheme is transmitted to the decoder using one bit. Based on the prediction, a set of delta-indices are computed.

The delta-indices are further encoded using a type of entropy code, a unitary code. It assigns shorter code words for smaller values, so that stable stereo conditions will produce a lower parameter bitrate.

TABLE 1

Example code words for delta indices

| Value | Codeword | Length |
|---|---|---|
| −3 | 11101 | 5 |
| −2 | 1101 | 4 |
| −1 | 101 | 3 |
| 0 | 0 | 1 |
| 1 | 100 | 3 |
| 2 | 1100 | 4 |
| 3 | 11100 | 5 |

Figure 8:
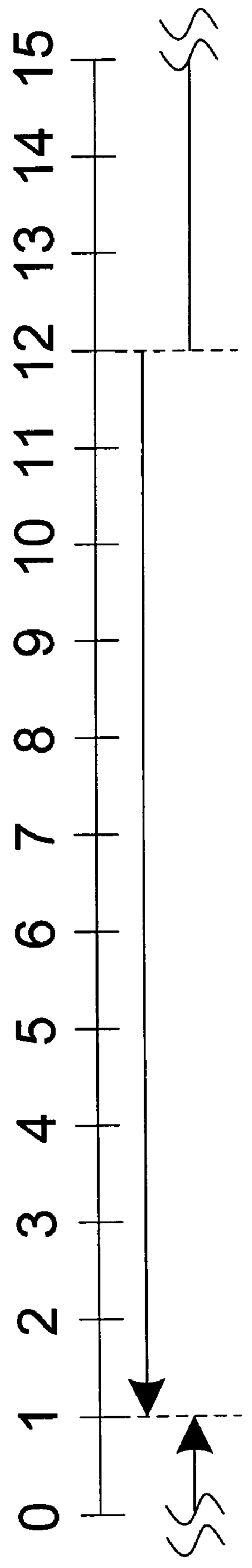
FIG. 8 is a schematic diagram illustrating how the bounds of a quantizer can be used so that a potentially shorter wraparound step can be taken.
Figure 9A:
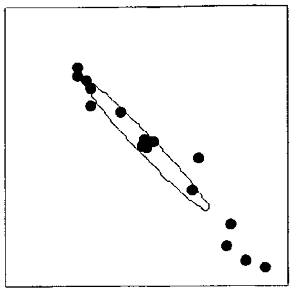
FIGS. 9A-H are example scatter plots in L/R signal planes for a particular frame using eight bands.
Figure 9B:
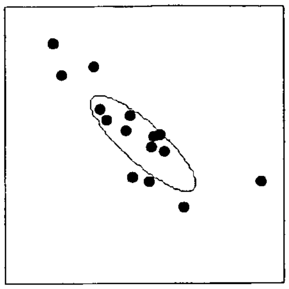
Figure 9C:
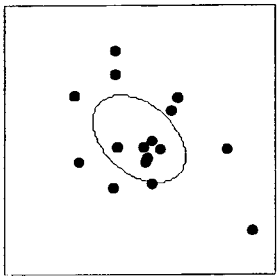
Figure 9D:
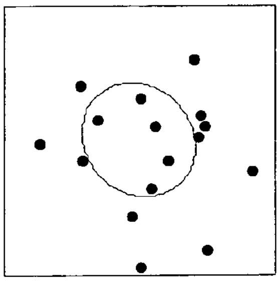
Figure 9E:
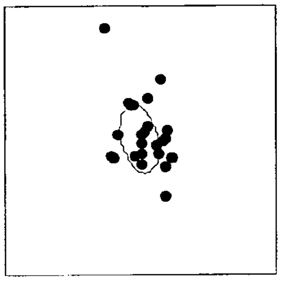
Figure 9F:
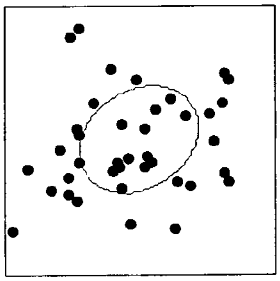
Figure 9G:
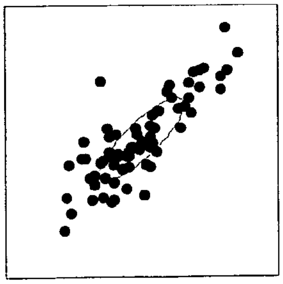
Figure 9H:
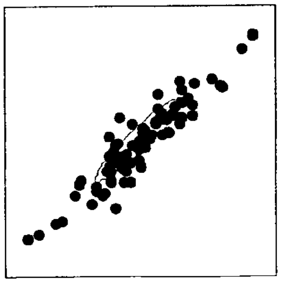

The delta index uses the bounds of the quantizer, so that the wrap-around step may be considered, as illustrated in FIG. 8.

Figure 10:
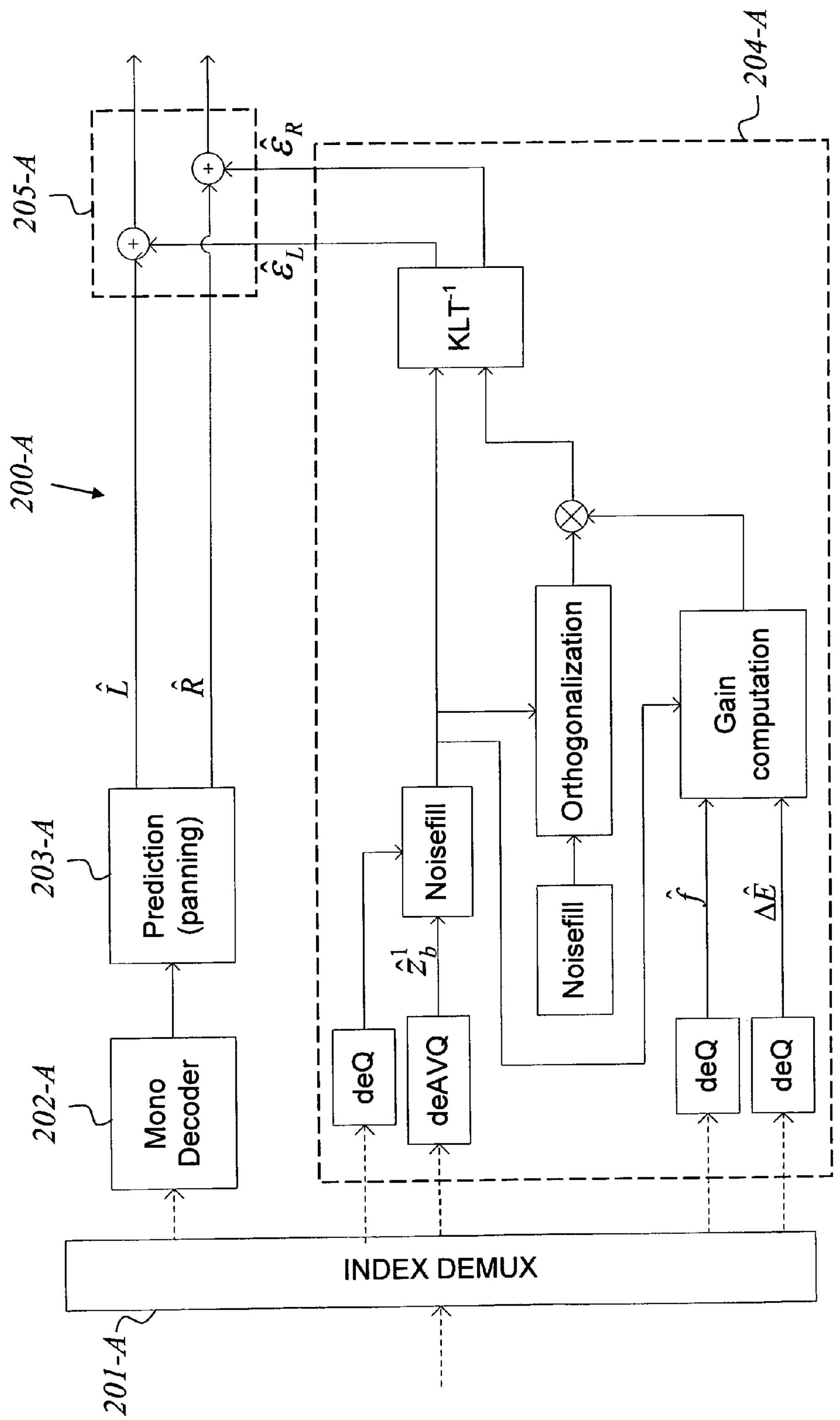
FIG. 10 is a schematic diagram illustrating an overview of a stereo decoder corresponding to the stereo encoder of FIG. 5.

FIG. 10 is a schematic diagram illustrating an overview of a stereo decoder corresponding to the stereo encoder of FIG. 5. The stereo decoder of FIG. 10 basically includes an index demultiplexing unit 201-A, a mono decoder 202-A, a prediction unit 203-A, and a residual error decoding unit 204-A operating based on dequantization (deQ), noise filling, orthogonalization, optional gain computation and inverse KLT transformation ($KLT^{-1}$), and a residual addition unit 205-A. Examples of the operation of the residual error decoding unit 204-A has been described above. The mono decoder 202-A implements a first decoding process, and the prediction unit 203-A implements a second decoding process. The residual error decoding unit 204-A implements a third decoding process that together with the residual addition unit 205-A finally reconstructs the left and right stereo channels.

As already indicated, the invention is not only applicable to stereophonic (two-channel) encoding and decoding, but is generally applicable to multiple (i.e. at least two) channels. Examples with more than two channels include but are not limited to encoding/decoding 5.1 (front left, front centre, front right, rear left and rear right and subwoofer) or 2.1 (left, right and center subwoofer) multi-channel sound.

Figure 11A:
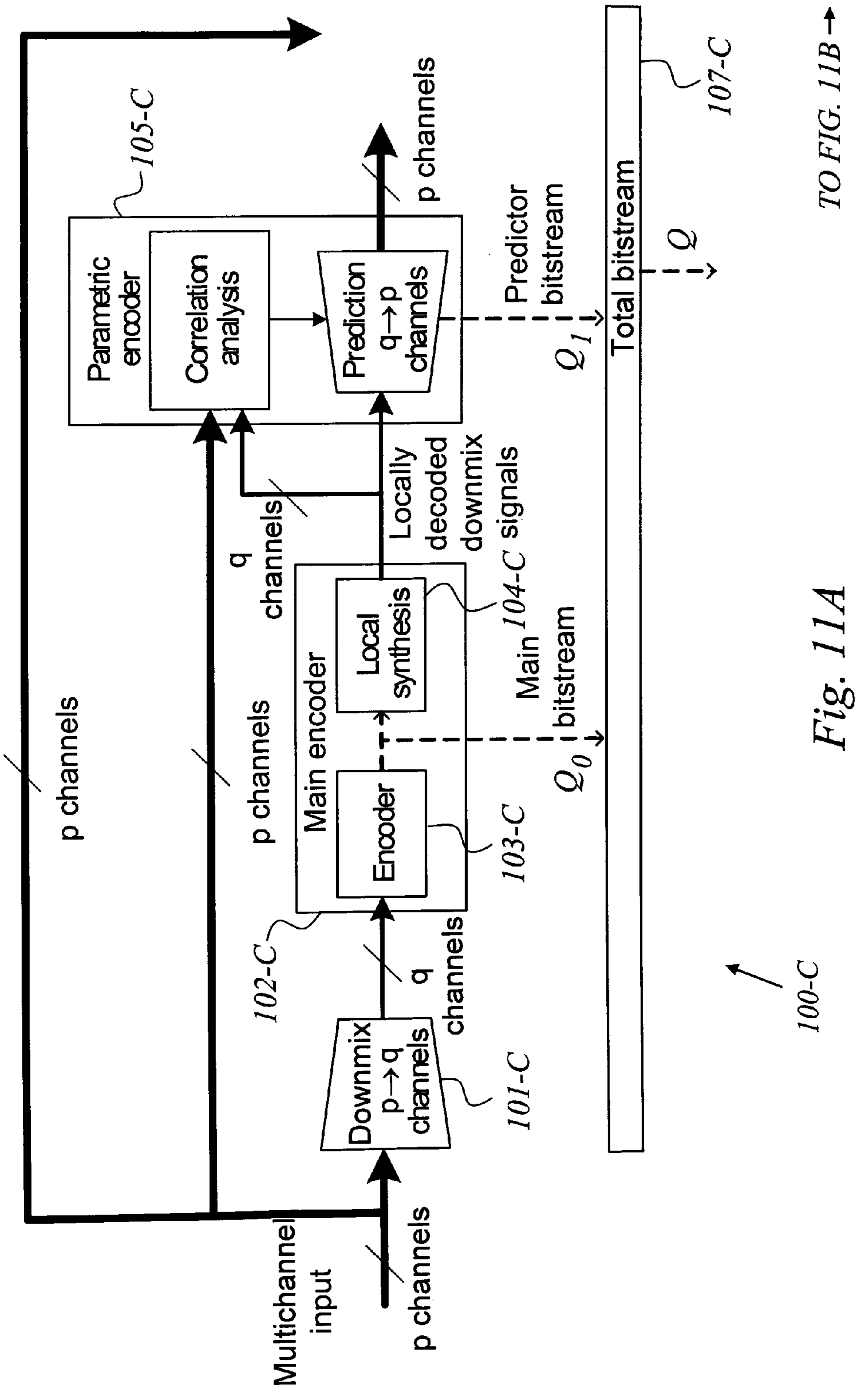
FIG. 11 is a schematic block diagram of a multi-channel audio encoder according to an exemplary embodiment of the invention.
Figure 11B:
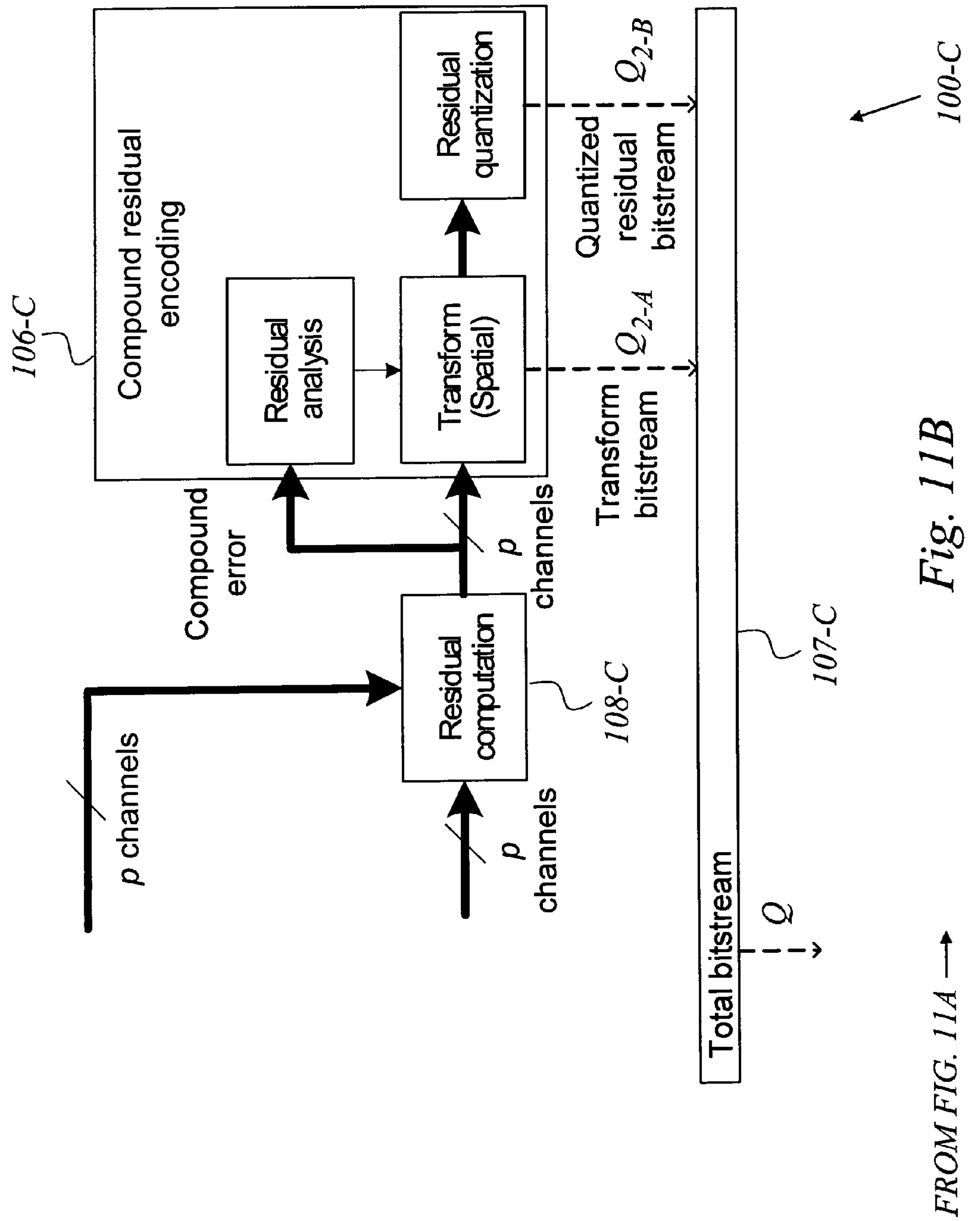

Reference will now be made to FIG. 11, which is a schematic diagram illustrating the invention in a general multi-channel context, although relating to an exemplary embodiment. The overall multi-channel encoder 100-C of FIG. 11 basically includes a down-mixer 101-C, a main encoder 102-C, a parametric encoder 105-C, a residual computation unit 108-C, a compound residual encoder 106-C, and a quantized bit stream collector 107-C. The main encoder 102-C typically includes an encoder unit 103-C and a local synthesizer 104-C. The main encoder 102-C implements a first encoding process, and the parametric encoder 105-C (together with the residual computation unit 108-C) implement a second encoding process. The compound residual encoder 106-C implements a third complementary encoding process.

The invention is based on the idea of implicitly refining both the down-mix quality as well as the multi-channel spatial quality in a consistent and unified way.

The invention provides a method and system to encode a multi-channel signal based on down-mixing of the channels into a reduced number of channels. The down-mix in the down-mixer 101-C is generally a process of reducing the number of input channels p to a smaller number of down-mix channels q. The down-mix can be any linear or non-linear combination of the input channels, performed in temporal domain or in frequency domain. The down-mix can be adapted to the signal properties.

The down-mixed channels are encoded by a main encoder 102-C, and more particularly the encoder unit 103-C thereof, and the resulting quantized bit stream is normally referred to as the main bitstream ($Q_0$). The locally decoded down-mixed channels from the local synthesizer module 104-C are fed to the parametric encoder 105-C. The parametric multi-channel encoder 105-C is typically configured to perform an analysis of the correlation between the down-mixed channels and the original multi-channel signal, and results in a prediction of the original multi-channel signals. The resulting quantized bit stream is normally referred to as the predictor bit stream ($Q_1$). Residual computation by module 108-C results in a set of residual error signals.

A further encoding stage, here referred to as the compound residual encoder 106-C, handles the compound residual encoding of the compound error between the predicted multi-channel signals and the original multi-channel signals. Because the predicted multi-channel signals are based on the locally decoded down-mixed channels, the compound prediction residual will contain both the spatial prediction error and the coding noise from the main encoder. In the further encoding stage 106-C, the compound error signal is analyzed, transformed and quantized ($Q_2$), allowing the invention to exploit correlation between the multi-channel prediction error and the coding error of the locally decoded down-mix signals, as well as implicitly sharing the available resources to uniformly refine both the decoded down-mixed channels as well as the spatial perception of the multi-channel output. The compound error encoder 106-C basically provides a so-called quantized transform bit stream ($Q_{2\text{-}A}$) and a quantized residual bit stream ($Q_{2\text{-}B}$).

The main bit stream of the main encoder 102-C, the predictor bit stream of the parametric encoder 105-C, and the transform bit stream and residual bit stream of the residual error encoder 106-C are transferred to the collector or multiplexor 107-C to provide a total bit stream (Q) for transmission to the decoding side.

The benefit of the suggested encoding scheme is that it may adapt to the signal properties and redirect resources to where they are most needed. It may also provide a low subjective distortion relative to the necessary quantized information, and represents a solution that consumes very little additional compression delay.

The invention also relates to a multi-channel decoder involving a multiple stage decoding procedure that can use the information extracted in the encoder to reconstruct a multi-channel output signal that is similar to the multi-channel input signal.

Figure 12:
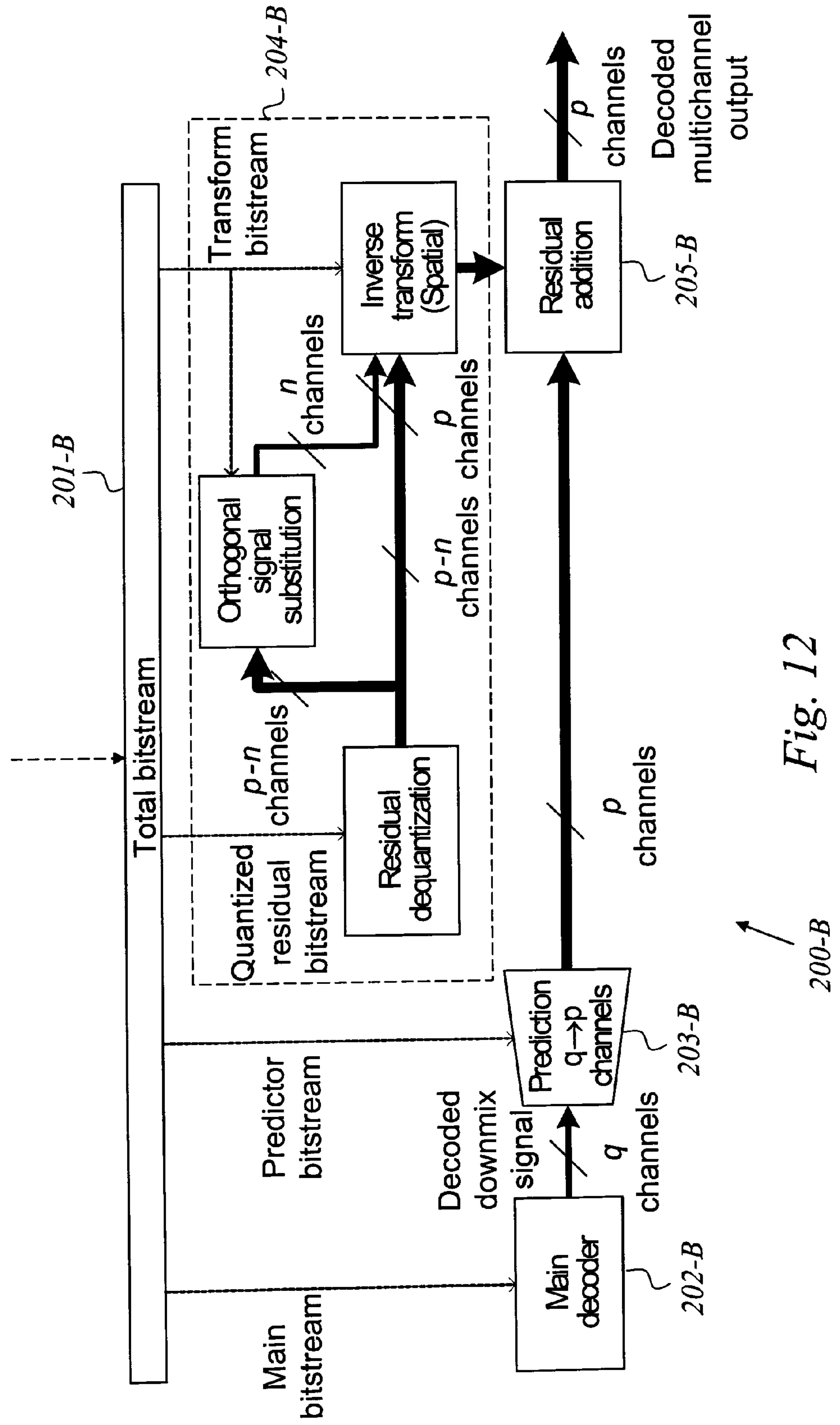
FIG. 12 is a schematic block diagram of a multi-channel audio decoder according to an exemplary embodiment of the invention.

As illustrated in the example of FIG. 12, the overall decoder 200-B includes a receiver unit 201-B for receiving a total bit stream from the encoding side, and a main decoder 202-B that, in response to a main bit stream, produces a decoded down-mix signal (having q channels) which is identical to the locally decoded down-mix signal in the corresponding encoder. The decoded down-mix signal is input to a parametric multi-channel decoder 203-B, together with the parameters (from the predictor bit stream) that was derived and used in the multi-channel encoder. The parametric multi-channel decoder 203-B performs a prediction to reconstruct a set of p predicted channels which are identical to the predicted channels in the encoder.

The final stage, in the form of the residual error decoder 204-B, of the decoder handles decoding of the encoded residual signal from the encoder, here provided in the form of a transform bit stream and a quantized residual bit stream. It also takes into consideration that the encoder might have reduced the number of channels in the residual due to bit rate constraints or that some signals were deemed less important and that these n channels were not encoded, only their energies were transmitted in an encoded form via the bitstream. To maintain the energy consistency and inter-channel correlation of the multi-channel input signals, an orthogonal signal substitution may be performed. The residual error decoder 204-B is configured to operate based on residual dequantization, orthogonal substitution and inverse transformation to reconstruct correlated residual error components. The decoded multi-channel output signal of the overall decoder is produced by letting the residual addition unit 205-B add the correlated residual error components to the decoded channels from the parametric multi-channel decoder 203-B.

Although encoding/decoding is often performed on a frame-by-frame basis, it is possible to perform bit allocation and encoding/decoding on variable sized frames, allowing signal adaptive optimized frame processing.

The embodiments described above are merely given as examples, and it should be understood that the present invention is not limited thereto.

ABBREVIATIONS

AAC Advanced Audio Coding
AAC-BSAC Advanced Audio Coding—Bit-Sliced Arithmetic Coding
ADPCM Adaptive Differential Pulse Code Modulation
AMR Adaptive Multi Rate
AMR-NB AMR NarrowBand
AMR-WB AMR WideBand
AMR-BWS AMR-BandWidth Scalable
AOT Audio Object Type
BCC Binaural Cue Coding
BMLD Binaural Masking Level Difference
CELP Code Excited Linear Prediction
EV Embedded VBR (Variable Bit Rate)
EVRC Enhanced Variable Rate Coder
FIR Finite Impulse Response
GSM Groupe Special Mobile; Global System for Mobile communications
ICP Inter Channel Prediction
KLT Karhunen-Loève Transform
LSB Least Significant Bit
MD-AMR Multi Description AMR
MDCT Modified Discrete Cosine Transform
MPEG Moving Picture Experts Group
MPEG-SLS MPEG-Scalable to Lossless
MSB Most Significant Bit
MSE Mean Squared Error
MMSE Minimum MSE
PCA Principal Components Analysis
PS Parametric Stereo
RTP Real-Time Protocol
SNR Signal-to-Noise Ratio
VMR Variable Multi Rate
VoIP Voice over Internet Protocol
xDSL x Digital Subscriber Line

REFERENCES

[1] ISO/IEC JTC 1, SC 29, WG 11/M11657, "Performance and functionality of existing MPEG-4 technology in the context of CfI on Scalable Speech and Audio Coding", January 2005.
[2] Hui Dong Gibson, J D Kokes, M G, "SNR and bandwidth scalable speech coding", Circuits and Systems, 2002. ISCAS 2002
[3] McCree et al, "AN EMBEDDED ADAPTIVE MULTI-RATE WIDEBAND SPEECH CODER", ICASSP 2001

[4]Koishida et al, "A 16-KBIT/S BANDWIDTH SCALABLE AUDIO CODER BASED ON THE G.729 STANDARD", ICASSP 2000

[5] Sjöberg et al, "Real-Time Transport Protocol (RTP) Payload Format and File Storage Format for the Adaptive Multi-Rate (AMR) and Adaptive Multi-Rate Wideband (AMR-WB) Audio Codecs", RFC 3267, IETF, June 2002

[6] H. Dong et al, "Multiple description speech coder based on AMR-WB for Mobile ad-hoc networks", ICASSP 2004.

[7] Chibani, M.; Gournay, P.; Lefebvre, R, "Increasing the Robustness of CELP-Based Coders By Constrained Optimization", ICASSP 2005

[8] Herre, "OVERVIEW OF MPEG-4 AUDIO AND ITS APPLICATIONS IN MOBILE COMMUNICATIONS", ICCT 2000

[9] Kovesi,"A SCALABLE SPEECH AND AUDIO CODING SCHEME WITH CONTINUOUS BITRATE FLEXIBILITY", ICASSP2004

[10] Johansson et al, "Bandwidth Efficient AMR Operation for VoIP", IEEE WS on SPC, 2002

[11] Recchione, "The Enhanced Variable Rate Coder Toll Quality Speech For CDMA", Journal of Speech Technology, 1999

[12] Uvliden et al, "Adaptive Multi-Rate—A speech service adapted to Cellular Radio Network Quality", Asilomar, 1998

[13] Chen et al, "Experiments on QoS Adaptation for Improving End User Speech Perception Over Multi-hop Wireless Networks", ICC, 1999

[14] C. Faller and F. Baumgarte, "Binaural cue coding—Part I: Psychoacoustic fundamentals and design principles", *IEEE Trans. Speech Audio Processing*, vol. 11, pp. 509-519, November 2003.

The invention claimed is:

1. A multi-channel audio encoding method based on an overall encoding procedure involving at least two signal encoding processes, including a first encoding process and a second encoding process, operating on signal representations of a set of audio input channels of a multi-channel audio signal, the method comprising:

performing local synthesis in connection with said first encoding process to generate a locally decoded signal including a representation of the encoding error of the first encoding process;

applying at least said locally decoded signal as input to said second encoding process;

generating at least two residual encoding error signals from at least one of said encoding processes, including at least said second encoding process; and performing compound residual encoding of said residual error signals in a further encoding process based on correlation between said residual error signals.

2. The multi-channel audio encoding method of claim 1, wherein said step of performing compound residual encoding includes the steps of:

decorrelating the correlated residual error signals by means of a transform to produce corresponding uncorrelated error components;

quantizing at least one of said uncorrelated error components; and quantizing a representation of said transform.

3. The multi-channel audio encoding method of claim 2, wherein said step of quantizing at least one of said uncorrelated error components comprises the step of performing bit allocation among the uncorrelated error components based on the energy levels of the error components.

4. The multi-channel audio encoding method of claim 2, wherein said transform is a Karhunen-Loève Transform (KLT).

5. The multi-channel audio encoding method of claim 4, wherein said representation of said transform includes a representation of a KLT rotation angle, and said second encoding process generates prediction parameters that are joined into a panning angle, and said panning angle and said KLT rotation angle are quantized.

6. The multi-channel audio encoding method of claim 5, wherein said panning angle and said KLT rotation angle are jointly quantized by differential quantization.

7. The multi-channel audio encoding method of claim 1, wherein said at least two residual encoding error signals are generated from said second encoding process.

8. The multi-channel audio encoding method of claim 1, wherein:

a first signal representation of said set of input channels is encoded in said first encoding process, at least one additional signal representation of at least part of said input channels is encoded in said second signal encoding process, while using the locally decoded signal as input to said second encoding process, and said residual error signals are processed in a compound residual encoding process including compound error analysis based on correlation between said residual signals.

9. The multi-channel audio encoding method of claim 1, wherein said first encoding process is a main encoding process and said second encoding process is an auxiliary encoding process.

10. A multi-channel audio encoder device comprising at least two encoders, including a first encoder and a second encoder, operating on signal representations of a set of audio input channels of a multi-channel audio signal, the multi-channel audio encoder device comprising:

means for local synthesis in connection with said first encoder to generate a locally decoded signal including a representation of the encoding error of said first encoder;

means for applying at least said locally decoded signal as input to said second encoder;

means for generating at least two residual encoding error signals from at least one of said first and second encoders, including at least said second encoder; and a compound residual encoder for compound residual encoding of said residual error signals based on correlation between said residual error signals.

11. The multi-channel audio encoder device of claim 10, wherein said compound residual encoder includes:

means for decorrelating the correlated residual error signals by using a transform to produce corresponding uncorrelated error components;

means for quantizing at least one of said uncorrelated error components; and means for quantizing a representation of said transform.

12. The multi-channel audio encoder device of claim 11, wherein said means for quantizing at least one of said uncorrelated error components is configured for performing bit allocation among the uncorrelated error components based on the energy levels of the error components.

13. The multi-channel audio encoder device of claim 11, wherein said transform is a Karhunen-Loève Transform (KLT).

14. The multi-channel audio encoder device of claim 13, wherein said representation of said transform includes a representation of a KLT rotation angle, and said second encoder is configured for generating prediction parameters that are joined into a panning angle, and said encoder device is configured for quantizing said panning angle and said KLT rotation angle.

15. The multi-channel audio encoder device of claim 14, wherein said encoder device is configured for jointly quantizing said panning angle and said KLT rotation angle by differential quantization.

16. The multi-channel audio encoder device of claim 10, wherein said at least two residual encoding error signals are generated from said second encoder.

17. The multi-channel audio encoder device of claim 10, wherein:

said first encoder is configured for encoding a first signal representation of said set of input channels, said second encoder is configured for encoding at least one additional signal representation of at least part of said input channels, while using the locally decoded signal as input to said second encoder, and said compound residual encoder is configured for processing said residual error signals including compound error analysis based on correlation between said residual signals.

18. The multi-channel audio encoder device of claim 10, wherein said first encoder is a main encoder and said second encoder is an auxiliary encoder.

19. The multi-channel audio encoder device of claim 18, wherein said compound residual encoder is configured to operate based on the correlation between a stereo prediction error and a mono coding error.

20. A multi-channel audio decoding method based on an overall decoding procedure involving at least two decoding processes, including a first decoding process and a second decoding process, operating on incoming bit streams for reconstruction of a multi-channel audio signal, the multi-channel audio decoding method comprising:

performing compound residual decoding in a further decoding process based on an incoming residual bit stream representative of uncorrelated residual error signal information to generate correlated residual error signals; and adding said correlated residual error signals to decoded channel representations from at least one of said first and second decoding processes, including at least said second decoding process, to generate the multi-channel audio signal.

21. The multi-channel audio decoding method of claim 20, wherein said first decoding process is a decoding process of a main decoder producing a decoded down-mix signal based on an incoming main bit stream, and said second decoding process is a decoding process of a parametric multi-channel decoder reconstructing a set of predicted channels based on the decoded down-mix signal and an incoming predictor bit stream.

22. The multi-channel audio decoding method of claim 20, wherein said step of performing compound residual decoding in a further decoding process comprises the steps of performing residual dequantization based on said incoming residual bit stream, and performing orthogonal signal substitution and inverse transformation based on an incoming transform bit stream to generate said correlated residual error signals.

23. The multi-channel audio decoding method of claim 22, wherein said inverse transformation is an inverse of a Karhunen-Loève Transform (KLT).

24. The multi-channel audio decoding method of claim 23, wherein said incoming residual bit stream includes a first quantized uncorrelated component and an indication of energy of a second uncorrelated component, and said transform bit stream includes a representation of said KLT transform, and said first quantized uncorrelated component is decoded and said second uncorrelated component is simulated by noise filling at the indicated energy, and said inverse KLT transformation is based on said first decoded uncorrelated component and said simulated second uncorrelated component and said KLT transform representation to produce said correlated residual error signals.

25. A multi-channel audio decoder device comprising at least two decoders, including a first decoder and a second decoder, operating on incoming bit streams for reconstruction of a multi-channel audio signal, the multi-channel audio decoder device comprising:

a compound residual decoder configured for performing compound residual decoding based on an incoming residual bit stream representative of uncorrelated residual error signal information to generate correlated residual error signals; and an adder module configured to add said correlated residual error signals to decoded channel representations from at least one of said first and second decoders, including at least said second decoder, to generate the multi-channel audio signal.

26. The multi-channel audio decoder device of claim 25, wherein said first decoder is a main decoder for producing a decoded down-mix signal based on an incoming main bit stream, and said second decoder is a parametric multi-channel decoder for reconstructing a set of predicted channels based on the decoded down-mix signal and an incoming predictor bit stream.

27. The multi-channel audio decoder device of claim 25, wherein said compound residual decoder comprises:

means for residual dequantization based on said incoming residual bit stream; and means for orthogonal signal substitution and inverse transformation based on an incoming transform bit stream to generate said correlated residual error signals.

28. The multi-channel audio decoder device of claim 27, wherein said inverse transformation is an inverse of a Karhunen-Loève Transform (KLT).

29. The multi-channel audio decoder device of claim 28, wherein said incoming residual bit stream includes a first quantized uncorrelated component and an indication of energy of a second uncorrelated component, and said transform bit stream includes a representation of said KLT transform, and said compound residual decoder is configured for decoding said first quantized uncorrelated component and for simulating said second uncorrelated component by noise filling at the indicated energy, and said inverse KLT transformation is based on said first decoded uncorrelated component and said simulated second uncorrelated component and said KLT transform representation to produce said correlated residual error signals.

30. An audio transmission system comprising an audio encoder device of claim 10 and an audio decoder device, wherein the audio decoder device comprises:

at least two decoders, including a first decoder and a second decoder, operating on incoming bit streams for reconstruction of a multi-channel audio signal;

a compound residual decoder configured for performing compound residual decoding based on an incoming residual bit stream representative of uncorrelated residual error signal information to generate correlated residual error signals; and an adder module configured to add said correlated residual error signals to decoded channel representations from at least one of said first and second decoders, including at least said second decoder, to generate the multi-channel audio signal.

* * * * *

UNITED STATES PATENT AND TRADEMARK OFFICE
CERTIFICATE OF CORRECTION

PATENT NO. : 8,218,775 B2
APPLICATION NO. : 12/677383
DATED : July 10, 2012
INVENTOR(S) : Norvell et al.

It is certified that error appears in the above-identified patent and that said Letters Patent is hereby corrected as shown below:

On The Title Page,

On Page 2, in Item (56), under “OTHER PUBLICATIONS”, in Column 1, Line 5, delete “Cfl” and insert -- Cfl --, therefor.

In The Claims,

In Column 2, Line 29, delete “3GPP2NMR-WB” and insert -- 3GPP2/VMR-WB --, therefor.

In Column 2, Line 56, delete “butt” and insert -- but --, therefor.

In Column 15, Line 38, in Equation, delete “ $E[R_b L_b^*] - \frac{E[\hat{M}_b L_b^*][\hat{M}_b R_b^*]}{E[\hat{M}_b \hat{M}_b^*]}$ ” and insert -- $E[R_b L_b^*] - \frac{E[\hat{M}_b L_b^*]E[\hat{M}_b R_b^*]}{E[\hat{M}_b \hat{M}_b^*]}$ --, therefor.

Signed and Sealed this
Thirty-first Day of May, 2016

Michelle K. Lee
*Director of the United States Patent and Trademark Office*